(12) United States Patent
Bracha et al.

(10) Patent No.: US 6,618,769 B1
(45) Date of Patent: Sep. 9, 2003

(54) MODULE-BY-MODULE VERIFICATION

(75) Inventors: Gilad Bracha, Los Altos, CA (US); Sheng Liang, Mountain View, CA (US); Timothy G. Lindholm, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/320,574

(22) Filed: May 27, 1999

(51) Int. Cl.$^7$ .................................................. G06F 9/00
(52) U.S. Cl. ........................................ 709/332; 717/165
(58) Field of Search ................................ 709/331, 332; 717/162–167

(56) References Cited

U.S. PATENT DOCUMENTS

| | | | |
|---|---|---|---|
| 5,504,568 A | 4/1996 | Saraswat et al. | 399/364 |
| 5,617,214 A | 4/1997 | Webster et al. | 358/296 |
| 5,631,740 A | 5/1997 | Webster et al. | 358/296 |
| 5,668,942 A | 9/1997 | Fromherz | 358/1.13 |
| 5,694,529 A | 12/1997 | Fromherz | 358/1.15 |
| 5,696,893 A | 12/1997 | Fromherz et al. | 358/1.13 |
| 5,701,557 A | 12/1997 | Webster et al. | 358/77 |
| 5,708,811 A * | 1/1998 | Arendt et al. | 717/163 |
| 5,729,790 A | 3/1998 | Conley et al. | 399/77 |
| 5,740,441 A * | 4/1998 | Yellin et al. | 717/134 |
| 5,771,339 A | 6/1998 | Fromherz | 358/1.13 |
| 5,781,710 A | 7/1998 | Fromhetz et al. | 358/1.15 |
| 5,812,273 A | 9/1998 | Conley et al. | 358/296 |
| 5,835,688 A | 11/1998 | Fromherz | 358/1.13 |
| 6,092,147 A * | 7/2000 | Levy et al. | 711/6 |
| 6,430,569 B1 * | 8/2002 | Bracha et al. | 707/103 R |

FOREIGN PATENT DOCUMENTS

EP    0778522 A2    6/1997    ............. G06F/9/45

OTHER PUBLICATIONS

Phillip W. L. Fong, et al., "*Proof Linking: An Architecture for Modular Verification of Dynamically–Linked Mobile Code*" School of Computing Science, Simon Fraser University, B.C., Canada, Sigsoft, Nov. 1998, pp. 222–230.

Luca Cardelli, "*Program Fragments, Linking, and Modularization*" Digital Equipment Corporation, System Research Center, POPL 97, Paris France.

Sheng Liang, et al., *Dynamic Class Loading in the Java ™ Virtual Machine* Sun Microsystems, Inc. OOPSLA 10/98, Vancouver, B.C.

\* cited by examiner

*Primary Examiner*—St. John Courtenay, III
(74) *Attorney, Agent, or Firm*—Finnegan, Henderson, Farabow, Garrett & Dunner

(57) ABSTRACT

A method, computer program, signal transmission and apparatus pre-verify instructions in a module of a computer program one module-at-a-time. First it is determined whether checking an instruction in a first module which is loaded requires information in a referenced module different than the first module. If the information is required, a constraint for the referenced module is written without loading or otherwise accessing the referenced module. During linking it is determined whether a first module which is loaded has passed pre-verification one-module-at-a-time before linking. A pre-verification constraint on a constrained module is read, if any, if the first module has passed such verification. If any pre-verification constraint is read, the pre-verification constraint is enforced if the constrained module is already loaded.

21 Claims, 18 Drawing Sheets

```
class BAR
   . . .
   void FOO (arg) {
      . . .
      if (arg) {
         . . .
            A var = new B ()
         . . .
      }
      else {
         . . .
      }
      z = z * z
   }
```

MODULE-BY-MODULE VERIFICATION

CROSS REFERENCE TO RELATED APPLICATIONS

This application is related to U.S. patent application Ser. No. 575,291 filed Dec. 20, 1995, Yellin and Gosling, entitled BYTECODE PROGRAM INTERPRETER APPARATUS AND METHOD WITH PRE-VERIFICATION OF DATA TYPE RESTRICTIONS AND OBJECT INITIALIZATION, now U.S. Pat. No. 5,740,441; U.S. patent application Ser. No. 09/134,477 filed Aug. 14, 1998, Bracha and Liang, entitled METHODS AND APPARATUS FOR TYPE SAFE, LAZY, USER-DEFINED CLASS LOADING; the disclosures of which are incorporated herein in their entireties by reference.

This application is also related to U.S. patent application Ser. No. 09/320,223 filed May 27, 1999, entitled FULLY LAZY LINKING; U.S. patent application Ser. No. 09/321,226 filed May 27, 1999, entitled FULLY LAZY LINK G WITH MODULE-BY-MODULE VERIFICATION; U.S. patent application Ser. No. 09/320,581 filed May 27, 1999, entitled CACHING UNTRUSTED MODULES FOR MODULE-BY-MODULE VERIFICATION; U.S. patent application Ser. No. 09/321,228 filed May 27, 1999, entitled DATAFLOW ALGORITHM FOR SYMBOLIC COMPUTATION OF LOWEST UPPER BOUND TYPE.

FIELD OF THE INVENTION

This invention generally relates to computer programming languages, and more particularly to computer programming languages with dynamic linking that verify instructions while supporting lazy loading.

DESCRIPTION OF RELATED ART

In general, computer programs are written as source code statements in a high level language which is easy for a human being to understand. As the computer programs are actually executed, a computer responds to machine code, which consists of instructions comprised of binary signals that directly control the operation of a central processing unit (CPU). It is well known in the art to use a special program called a compiler to read the source code and to convert its statements into the machine code instructions of the specific CPU. The machine code instructions thus produced are platform dependent, that is, different computer devices have different CPUs with different instruction sets indicated by different machine codes.

It is also known in the art to construct more powerful programs by combining several simpler programs. This combination can be made by copying segments of source code together before compiling and then compiling the combined source. When a segment of source code statements is frequently used without changes it is often preferable to compile it once, by itself, to produce a module, and to combine the module with other modules only when that functionality is actually needed. This combining of modules after compilation is called linking. When the decision on which modules to combine depends on run time conditions and the combination of the modules happens at run time, just before execution, the linking is called dynamic linking.

An advantage of linking is that programs can be developed a module at a time and productivity can be enhanced as different developers work, possibly at different sites, simultaneously on separate modules.

An advantage of linking performed at run time, that is, dynamic linking when the program is being executed, is that modules not used during execution need not be linked, thus reducing the number of operations that must be executed and likely reducing the size of the executing code. In general, modules have to be loaded, that is identified and brought into memory, before being linked. The deferred linking of modules until the module is needed allows a deferral in loading those modules as well, which is called lazy loading.

It is prudent, when assembling several modules that may have been written independently, to check both that each module performs properly within its own four corners, i.e., with intra-module checks, and also that the modules work properly together, i.e. with inter-module checks. By analogy with the terminology used by the designers of the JAVA™ programming language, this post compilation module checking can be called verification.

An example of a computer architecture that benefits from dynamic linking is a virtual machine (VM) such as the JAVA™ virtual machine (JVM) of Sun Microsystems, Inc., which is an abstract computer architecture that can be implemented in hardware or software. Either implementation is intended to be included in the following descriptions of a VM.

A VM can provide platform independence in the following manner. Statements expressed in a high level computing language, such as the JAVA™ programming language, are compiled into VM instructions that are system independent. The VM instructions are to the VM what machine code is to a central processing unit (CPU). The VM instructions can then be transferred from one machine to another. Each different processor needs its own implementation of a VM. The VM runs the VM instructions by translating or interpreting the VM instructions one or more instructions at a time. In many implementations, the VM implementation is a program running on the CPU of a particular computer, but the VM instructions may also be used as the native instruction set of a particular processor or device. In the latter case, the VM is an "actual" machine. Other operations can also be performed by the VM including dynamic linking and verification.

The process of programming using such a VM then has two time epochs associated with it, "compile time" refers to the steps which convert the high level language into the VM instructions, and "run time" refers to the steps which in a JAVA™ VM environment, interpret instructions to execute the module. Between compile time and run time, the modules of instructions compiled from statements can reside dormant for extended, arbitrary periods of time, or can be transferred from one storage device to another, including being transferred across a network.

The problems encountered in trying to implement dynamic linking with verification and with or without lazy loading can be illustrated for the example of the JAVA™ virtual machine. The JVM is a particular VM for the object oriented JAVA™ high level programming language that is designed to perform dynamic linking, verification and lazy loading as described for the conventional JVM in The JAVA™ Virtual Machine Specification, by T. Lindholm and Frank Yellin, Addison-Wesley, Menlo Park, Calif., 1997.

Object oriented programming techniques such as those used by the JAVA™ platform are widely used. The basic unit of object oriented programs is the object which has methods (procedures) and fields (data), herein called members. Objects that share members are grouped into classes. A class defines the shared members of the objects in the class. Each object then is a particular instance of the class to which it belongs. In practice, a class is often used as a template to create multiple objects (multiple instances) with similar features.

One property of classes is encapsulation, which describes the property that the actual implementation of the members within the class are hidden from an outside user, and other classes, except as exposed by an interface. This makes classes suitable for distributed development, for example by different developers at different sites on a network. A complete program can be formed by assembling the classes that are needed, linking them together, and executing the resulting program.

Classes enjoy the property of inheritance. Inheritance is a mechanism that enables one class to inherit all of the members of another class. The class that inherits from another class is called a subclass; the class that provides the attributes is the superclass. Symbolically, this can be written as subclass <=superclass, or superclass=>subclass. The subclass can extend the capabilities of the superclass by adding additional members. The subclass can override an attribute of the superclass by providing a substitute member with the same name and type.

The JVM operates on a particular binary format for the compiled classes—the class file format. A class file contains JVM instructions and a symbol table, as well as other ancillary information. For the sake of security, the JVM imposes strong format and structural constraints on the instructions in a class file. In particular example, JVM instructions are type specific, intended to operate on operands that are of a given type as explained below. Similar constraints could be imposed by any VM. Any language with functionality that can be expressed in terms of a valid class file can be hosted by the JVM. The class file is designed to handle object oriented structures that can represent programs written in the JAVA™ programming language, but may also support several other programming languages.

In the class file, a variable is a storage location that has associated a type, sometimes called its compile-time type, that is either a primitive type or a reference type. The reference types are pointers to objects or a special null reference which refers to no object. The type of a subclass is said to be a subtype of its superclass. The primitive types for the JVM include boolean (taking the truth values true and false), char (code for a Unicode character), byte (signed eight bits of 0 or 1), short (signed short integer), int (signed integer), long (signed long integer), float (single-precision floating point number) or double (double precision floating point number).

The members of a class type are fields and methods; these include members inherited from the superclass. The class file also names the superclass. A member can be public, which means that it can be accessed by members of any class. A private member may be accessed only by members of the class that contains its declaration. A protected member may be accessed by members of the declaring class or from anywhere in the package in which it is declared. In the JAVA™ programming language, classes can be grouped and the group can be named; the named group of classes is a package.

The actual instructions for the JVM are contained within methods of the class encoded by the class file.

When a JAVA™ language program violates constraints of an operation, the JVM detects an invalid condition and signals this error to the program as an exception. An exception is said to be thrown from the point where it occurred and it is said to be caught at the point to which control is transferred. Every exception is represented by an instance of the class Throwable or one of its subclasses; such an object can be used to carry information from the point at which an exception occurs to part of the program, an exception handler, that catches it and deals with it.

The JVM starts execution by invoking the method "main" of some specified class, passing it a single argument which is an array of strings. This causes the specified class to be loaded, linked and initialized.

Loading refers to the process of finding the binary form of a class or package with a particular name, typically by retrieving a binary representation previously compiled from source code. In the JVM, the loading step retrieves the class file representing the desired class. The loading process is implemented by the bootstrap class loader or a user defined class loader. A user-defined class loader is itself defined by a class. A class loader may indicate a particular sequence of locations to search in order to find the class file representing a named class. A class loader may cache binary representations of classes, pre-fetching based on expected usage, or load a group of related classes together. The more classes that are pre-fetched or group loaded the more "eager" is the loader. A "lazy" loader pre-fetches or groups as few classes as possible. The conventional JVM specification permits a broad spectrum of loading behaviors between eager and almost fully lazy.

A VM is fully lazy if it calls a class loader to load a class only at the time that,the class is first necessary to execute an instruction of a class currently being processed. Fully lazy loading, if achieved, does not waste run time resources, such as system memory and execution time, loading classes that are not strictly required at run time.

Linking in the JVM is the process of taking a binary form of a class in memory and combining it into the run time state of a VM, so that it can be executed. A class must be loaded before it can be linked. Three different activities are involved in linking according to the JVM spec: verification, preparation and resolution of symbolic references.

During verification, necessary constraints on a binary class in the class file format are checked. Doing so is fundamental to the security provisions of the JVM. Verification ensures that illegal operations are not attempted by the JVM that can lead to meaningless results or that can compromise the integrity of the operating system, the file system, or the JVM itself However, checking these constraints sometimes requires knowledge of subtyping relations among other classes; so successful verification typically depends on the properties of other classes referenced by the class being verified. This has the effect of making the current JVM design specification for verification context sensitive.

The binary classes of the JVM are essentially exemplars of general program modules that contain instructions produced from compiled source statements. Context sensitivity of validity checks means that those checks depend on information spread across mote than one module, i.e., those checks are called cross-module checks or inter-module checks herein. Validity checks that do not require information from another module are called intra-module checks herein.

Context sensitive verification has some disadvantages. For example in an object oriented programming system like the JAVA™ platform, it leads to a verifier initiating class loading when the verifier needs to check subtype relations among classes not already loaded. Such loading can occur even if the code referencing the other classes is not ever executed. That is, context sensitive verification can interfere with fully lazy loading. Because of this, loading can consume memory and slow execution at run time compared to a process that does not load the classes unless they are referenced by the instructions that are actually executed.

When verification is context sensitive there is also no provision for verifying one class or module at a time before run time. This is a disadvantage because classes cannot be verified ahead of time, e.g. before run time, so verification must incur a run time cost. Thus there is a need for module-by-module, also called module-at-a-time, verification before run time. Such verification is herein called pre-verification because technically it is distinct from the verification which occurs during run time linking by the JVM.

Also, since verification is performed at run time, a class that has been run once, and passed verification, is subjected to verification again each time the class is loaded—even if the class is being used in the same application on the same host computer, where no new verification issues are likely or where a situation can be arranged such that no changes that would affect verification can be made. This can lead to redundant verification, thereby requiring more memory and executing more slowly during run time than ought to be necessary. Thus there is a need for an option to use pre-verified modules without further, or with minimum, verification at run time.

The needs for pre-verification and fully lazy loading are separate needs that might be met separately. There is also a need for supporting module-by-module pre-verification along with fully lazy loading.

The need for pre-verification, including reduction of run time verification, may conflict with the goals of security that require all modules supplied to a virtual machine or any computing architecture be checked at run time to prevent illegal or damaging operations. For example, in an untrusted situation, such as downloading a module and its pre-verification output from the Internet, an attacker may be able to spoof the pre-verification output—possibly making a malignant class appear benign. Thus, there is a need for pre-verification that is usable in untrusted situations, as in downloading modules across the Internet.

The need for fully lazy loading or module-by-module pre-verification engenders a need for a substitute representation of a type lattice. A type lattice is a mathematical structure expressing subtyping relationships among types. A representation of a type lattice is built by the JVM for indicating the types and subtypes of classes during run time. The JVM also maintains references and types of all the attributes of the classes that are being linked. Similar run time structures are expected to be useful for any dynamic linking process. To support class-by-class pre-verification or fully lazy loading, type checking must be done without full knowledge of the type lattice, most of which is typically defined in other modules which may not yet otherwise need to be loaded. In particular, the JVM typically needs to find a LUB (lowest upper bound) type in the type lattice during verification. Thus, there is a need to perform the functions that rely on a LUB even when the type lattice is-unavailable.

SUMMARY OF THE INVENTION

The foregoing and other features, aspects and advantages of the present invention will become more apparent from the following detailed description of the present invention when taken in conjunction with the accompanying drawings.

It is an object of the invention to allow verification during linking while without preventing fully lazy loading. It would be advantageous for a dynamic linker, and in particular the JVM, to require that all resolution of referenced modules (e.g. classes) would be done lazily at specific, defined points during execution of instructions (e.g., of a method). The advantages include:

Write once, run anywhere (WORA) characteristics are improved. The behavior of a program with respect to linkage errors is the same on all platforms and implementations.

Testability is greatly improved. For example, one need not anticipate all the places where a class or method might be linked and attempt to catch exceptions at all those places in case the class or method cannot be found.

Users can determine the presence of modules in a reliable and simple way. For example, the user can avoid linkage errors due to calls to modules missing on a different version of a run time environment by placing those references on a program branch that is not executed unless the different version is available.

The breadth of loading behaviors of the conventional JVM specification does not permit these advantages.

It is another object of the present invention to provide one-module-at-a-time pre-verification. It is also an object of the present invention to utilize pre-verified instructions to reduce run time verification. Some users of the JAVA™ platform would want to perform context insensitive, or context independent, verification checks on some classes. There are a number of advantages to context independent checking which can be performed during or after compilation and before run time. The advantages include:

Some verification errors can be detected before run time;

The linking component of run time if one is still required, is smaller and simpler because the amount of verification code it contains is reduced; and The user can store modules (in a secured repository, for example, a RDBMS (relational database management system) on a module-by-module basis rather than application by application, and do as much work as possible before of run time. This obviates redundant verification and reduces or eliminates run time costs of verification.

It is another object of the present invention to allow one-module (or class)-at-a-time pre-verification to be combined with run time verification that may permit fully lazy loading, in order to enjoy the benefits of both at the same time.

It is another object of the present invention to allow classes from untrusted sources to be pre-verified to increase the scope of situations in which the benefits of pre-verification apply.

It is another object of the present invention to utilize a substitute for a LUB when full knowledge of the type lattice is lacking to simplify inter-module validity checks.

These and other objects and advantages of the present invention are provided by a method, computer program, signal transmission and apparatus for verifying instructions in a module of a computer program one module-at-a-time before linking. This aspect of the invention includes determining whether checking an instruction in a first module which is loaded requires information in a referenced module different than the first module. If the information is required, a constraint for the referenced module is written without loading the referenced module.

In another aspect of the invention, instructions of a pre-verified module of a computer program are verified during linking. The method, computer program product, transmission signal and apparatus include determining whether a first module which is loaded has passed verification one-module-at-a-time before linking. If the first module has passed such verification, a pre-verification constraint on a constrained module is read, if any. If any pre-verification constraint is read, it is determined whether the constrained module is loaded. If the constrained module is loaded, the pre-verification constraint is enforced.

In another aspect of the invention, a pre-verification system includes a network and a computer readable storage medium connected to the network for storing a module of a computer program. A memory into which a module may be loaded is also connected to the network. A processor connected to the network is configured to determine before linking whether checking an instruction in a first module which is loaded requires information in a referenced module different than the first module, and to write a constraint for the referenced module without loading the referenced module if the information is required. This way, verification is performed one module at a time before linking. The same or a different processor is connected to the network and is configured to determine during linking whether a first module which is loaded has passed verification one-module-at-a-time before linking. A pre-verification constraint on a constrained module is read, if any, if the first module has passed verification. If any pre-verification constraint is read, the pre-verification constraint is enforced if the constrained module is already loaded. This way verification is performed one-module-at-a-time before linking with reduced verification during linking.

BRIEF DESCRIPTION OF THE DRAWINGS

The objects, features and advantages of the invention of the present invention will be apparent from the following description in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

DESCRIPTION OF THE PREFERRED EMBODIMENT

Figure 1A:
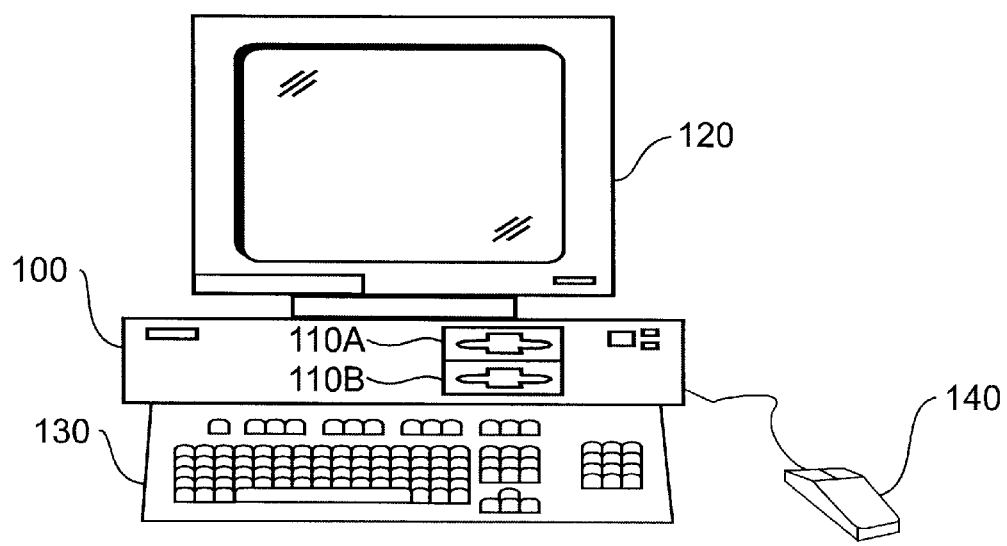
FIG. 1A is a view of an exemplary computer system suitable for use in carrying out the invention.

FIG. 1A illustrates a computer of a type suitable for carrying out the invention. Viewed externally in FIG. 1A, a computer system has a central processing unit 100 having disk drives 110A and 110B. Disk drive indications 110A and 110B are merely symbolic of a number of disk drives which might be accommodated by the computer system. Typically, these would include a floppy disk drive such as 110A, a hard disk drive (not shown externally) and a CD ROM or DVD drive indicated by slot 110B. The number and type of drives vary, typically, with different computer configurations. The computer has a display 120 upon which information is displayed. A keyboard 130 and mouse 140 are typically also available as input devices. The computer illustrated in FIG. 1A may be a SPARC workstation from Sun Microsystems, Inc.

Figure 1B:
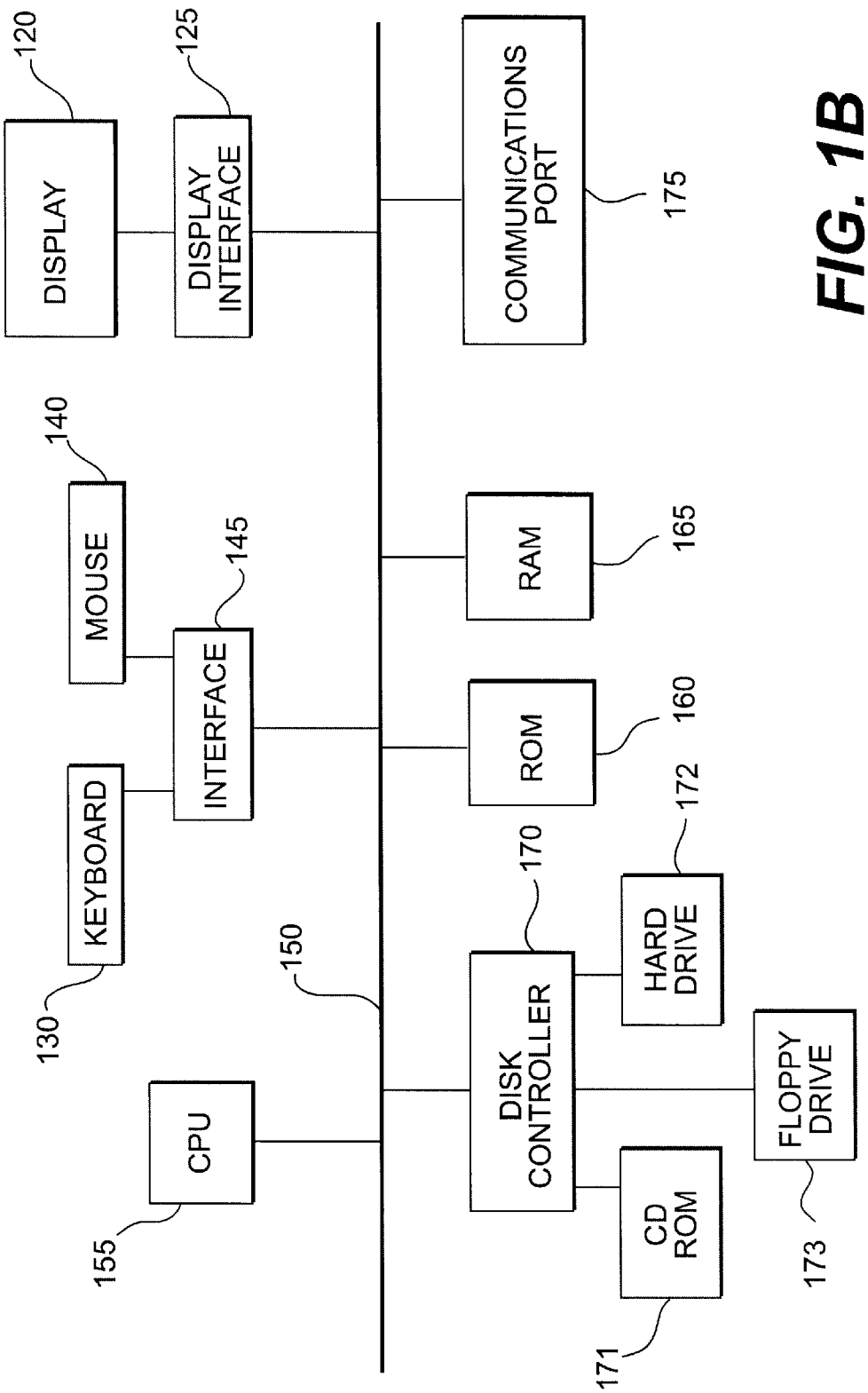
FIG. 1B is a block diagram of an exemplary hardware configuration of the computer of FIG. 1A.

FIG. 1B illustrates a block diagram of the internal hardware of the computer of FIG. 1A. A bus 150 serves as the main information highway interconnecting the other components of the computer. CPU 155 is the central processing unit of the system, performing calculations and logic operations required to execute programs. Read only memory (160) and random access memory (165) constitute the main memory of the computer. Disk controller 170 interfaces one or more disk drives to the system bus 150. These disk drives may be floppy disk drives, such as 173, internal or external hard drives, such as 172, or CD ROM or DVD (Digital Video Disks) drives such as 171. A display interface 125 interfaces a display 120 and permits information from the bus to be viewed on display. Communications with external devices can occur over communications port 175.

Figure 1C:
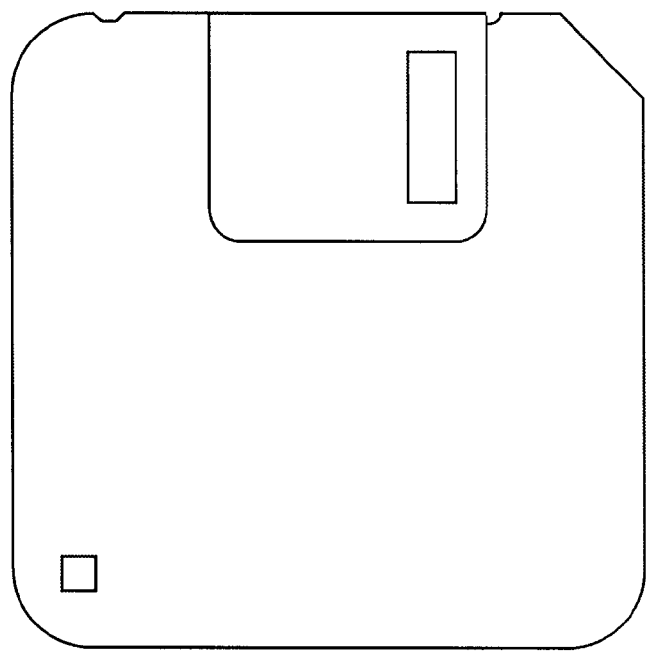
FIG. 1C is an illustration of exemplary memory medium suitable for storing program and data information in accordance with the invention.

FIG. 1C illustrates an exemplary memory medium which can be used with drives such as 173 in FIG. 1B or 110A in FIG. 1A. Typically, memory media, such as a floppy disk, or a CD-ROM, or a Digital Video Disk, will contain the program information for controlling the computer to enable the computer to perform its functions in accordance with the invention.

Figure 1D:
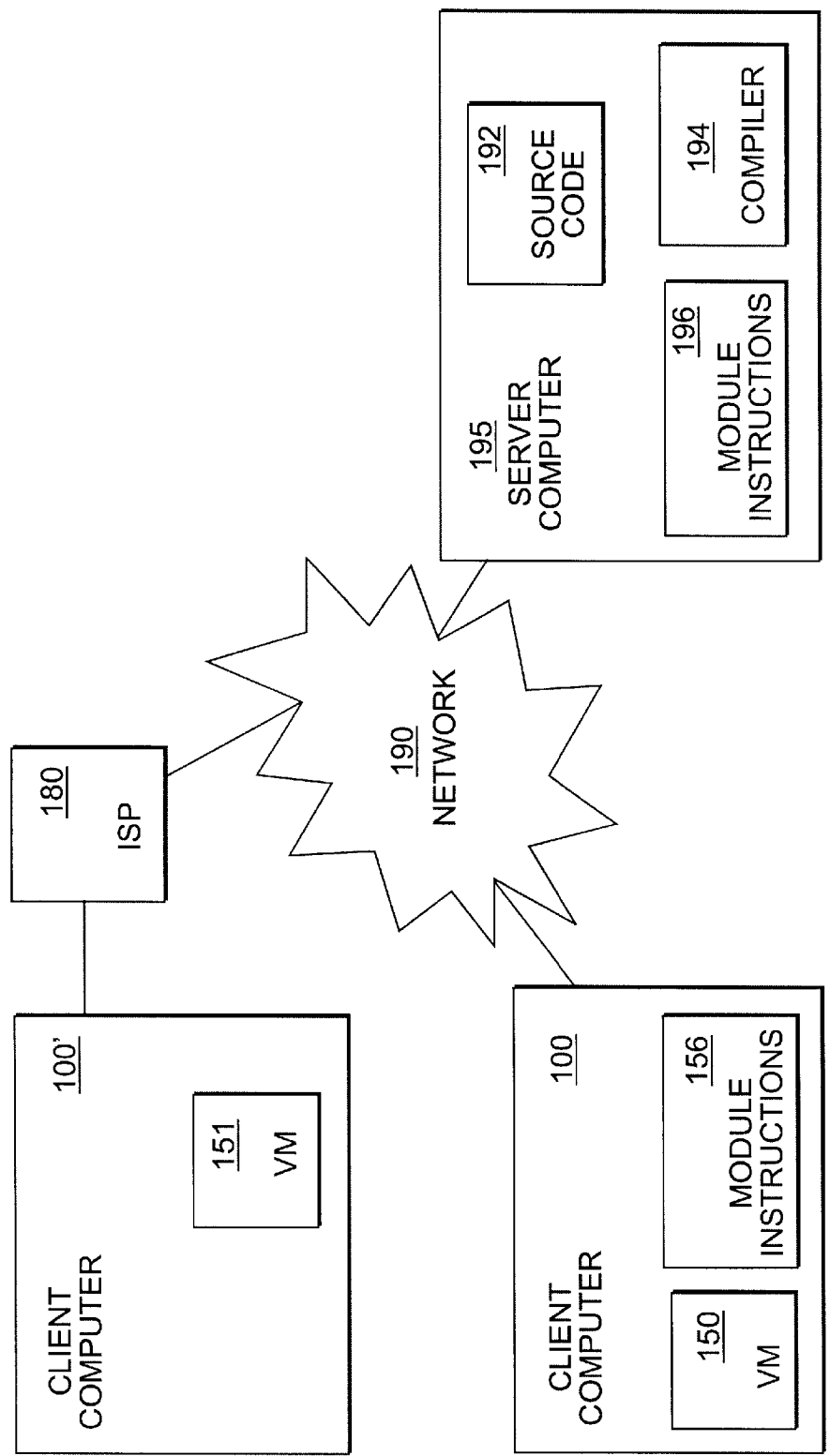
FIG. 1D is a block diagram of a network architecture suitable for carrying data and programs in accordance with the invention

FIG. 1D is a block diagram of a network architecture suitable for carrying data and programs in accordance with some aspects of the invention. A network 190 serves to connect a client computer 100 with one or more servers, such as server 195 for the download of program and data information. A client 100' can also connect to the network 190 via a network service provider, such as ISP 180. The elements related to a virtual machine (VM) or other computing architecture implemented in either hardware or software may be distributed across a network as described below.

Figures 1E, 2:
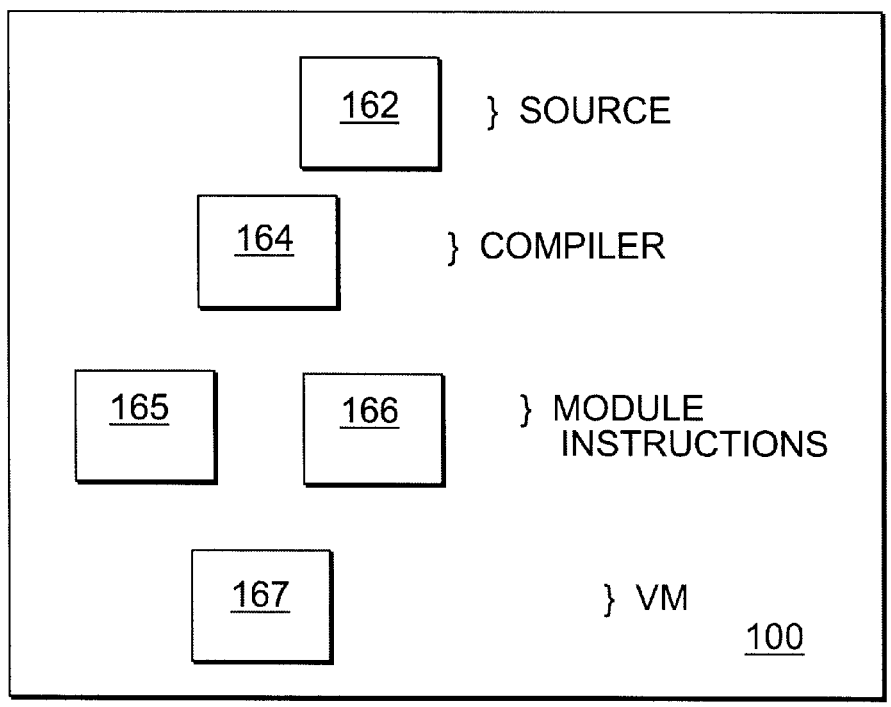
FIG. 1E is a block diagram of a computer configured in accordance with the invention.
FIG. 2 is an example of a class BAR having a method FOO and referencing classes A and B, in the pseudo language similar to the JAVA™ programming language.

FIG. 1E shows a single computer configured to have components related to a virtual machine. The components include source code statements 162 in one or more logical blocks of a memory medium in the computer, a compiler 164 which compiles the source code 162 to produce one or more modules 165, 166 containing instructions such as VM instructions, and a processor such as a virtual machine (VM) 167 which takes one or more modules 165, 166 as input and executes the program they generate. Though shown on one computer in FIG. 1E, it should be understood that a module 165, and the processor, e.g. the VM 167, need reside, at least temporarily, on the same computer. The module can be sent from a different computer which runs a compiler to generate the module from source code. For example, FIG. 1D shows a compiler 194 and source code 192 on the server 195 and two different implementations of the virtual machine 150, 151, one on each of the two clients 100, 100', respectively. The source code 192 (and 162 in FIG. 1E) can be any language, but is preferably in the JAVA™ language programming language, and may be written by a human programmer or output from another program. The module 196, produced by the compiler 194 on the server 195, can be transported across the network 190 and stored as a module, e.g., 156, on one of the client computers, e.g., 100. There the platform specific implementation of the VM, e.g., 150, can execute the instructions in the module 156.

Specifically, the present invention is described using the JVM but is not limited to the JVM. The invention applies to any process which at run time links program modules from various sources, and which verifies those program modules before they are executed.

As an example of pseudo-source code for a program module representing a class that exhibits the conditions that cause problems to be solved by the present invention, FIG. 2 shows pseudo source code written in a programming language similar to the JAVA™ programming language. The first line names the class "BAR." The first set of ellipses represents other statements that contribute to the definition of class BAR but will not be considered here. The next line through the end of the example defines a method named FOO in the class BAR (also denoted as BAR.FOO); the type "void" indicates that no value is returned when an invocation of the method FOO terminates. The next line introduces an "if else" construct that provides two branches during execution. If the method argument, named "arg," is true, one branch is executed, represented by the next set of ellipses, the assignment statement inside the braces and the following ellipses. The assignment statement states that the variable named "var" of class type A will be assigned a new instance of the class B. Thus, in this branch, reference is made to two other classes, class A and class B, the referenced classes. The next line, the else of the if else construct, signals the beginning of an alternate branch of the method, the branch taken if arg is false. This alternate branch is contained between the next braces and is represented by another set of ellipses to indicate that no reference is made to either class A or B in this branch. The branches converge again at the statement where the value of variable z is assigned to its original value squared.

Using example class BAR and its method FOO, the difference between eager loading, almost lazy loading, and fully lazy loading, and the advantages of the present invention, can be illustrated in a virtual machine such as the JVM. Of course, the JVM does not operate on the JAVA™-like programming language listed in FIG. 2, but operates instead on a module containing instructions typically generated by a compiler; the compiler operated on the high level programming language code such as that listed in FIG. 2.

Figure 3:
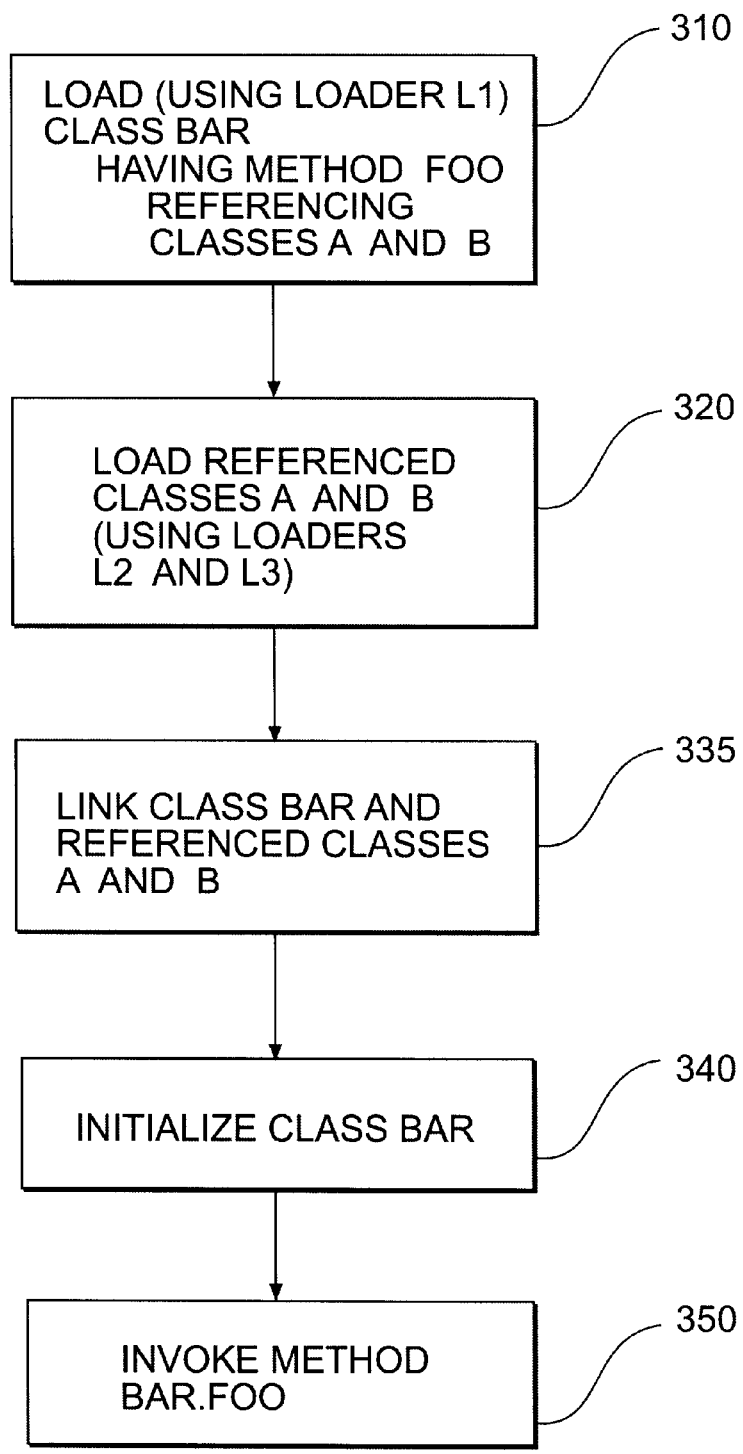
FIG. 3 is a flowchart depicting fully eager loading of the example class BAR from FIG. 2.

FIG. 3 depicts fully eager loading of example class BAR by a JVM. Assuming class BAR is not already loaded, when the time comes to invoke a method FOO defined in class BAR, in step 310, the JVM loads class BAR from some storage device into memory using the class loader for BAR, e.g., loader L1. Class BAR is then the current class. Since current class BAR references classes A and B, the eager JVM calls the loaders for both those classes as well, if they are not already loaded, in step 320. In FIG. 3, the class loaders for classes A and B are designated as L2 and L3, respectively; but L1, L2 and L3 may all be the same built-in or user-defined class loader, or any two may be the same, or each may be different.

During linking 335, verification is performed by the JVM. Many details on the procedures used during verification are described in U.S. Pat. No. 5,740,441 referenced above. As described in that patent, verification includes identifying any instruction sequence in a method that attempts to process data of the wrong type, or any instructions that would cause underflow or overflow of an operand stack of the virtual machine. Instructions in the JVM are type specific, so the operands operated on by the instruction must match the type the instruction is defined for. Operand stack overflow is an attempt to put an item, such as a primitive value or object reference, on an operand stack that would cause the stack to exceed the preset maximum size for the stack defined in the class file, i.e. when the stack is already full. Operand stack underflow occurs when an instruction attempts to take an item from an operand stack when there are no valid items left on the stack, i.e., when the stack is already empty. It is anticipated that any validity checks that can be performed prior to execution of the instructions in a module may be included in verification.

If verification of a module fails, the virtual machine should identify the error and not attempt to execute the instructions in the module. In the case of the JVM, the JVM throws a linkage or verification error message (not shown) that can be handled gracefully by class exception handlers.

If verification of a module succeeds and linking is complete, execution may begin. In this example case, the current class BAR may be initialized, step 340, and the method FOO.BAR of the current class is run, step 350, as the JVM interprets each instruction and executes it. The interpreter does not need to check types, or operand stack overflow or underflow, because that was already done by verification performed during linking 335.

Two advantages of the process involving dynamic linking, described above, are that classes developed and compiled by others can be used safely and that, after linking, execution is faster. Classes compiled by others can be used because they are verified during linking, prior to execution, to prevent invalid, and possibly dangerous operations. Because type checking and operand stack overflow and underflow were performed during verification, they are not performed upon instruction execution, so that execution times are faster. Similarly, other validity checks performed during verification can be safely skipped at execution.

Figure 4A:
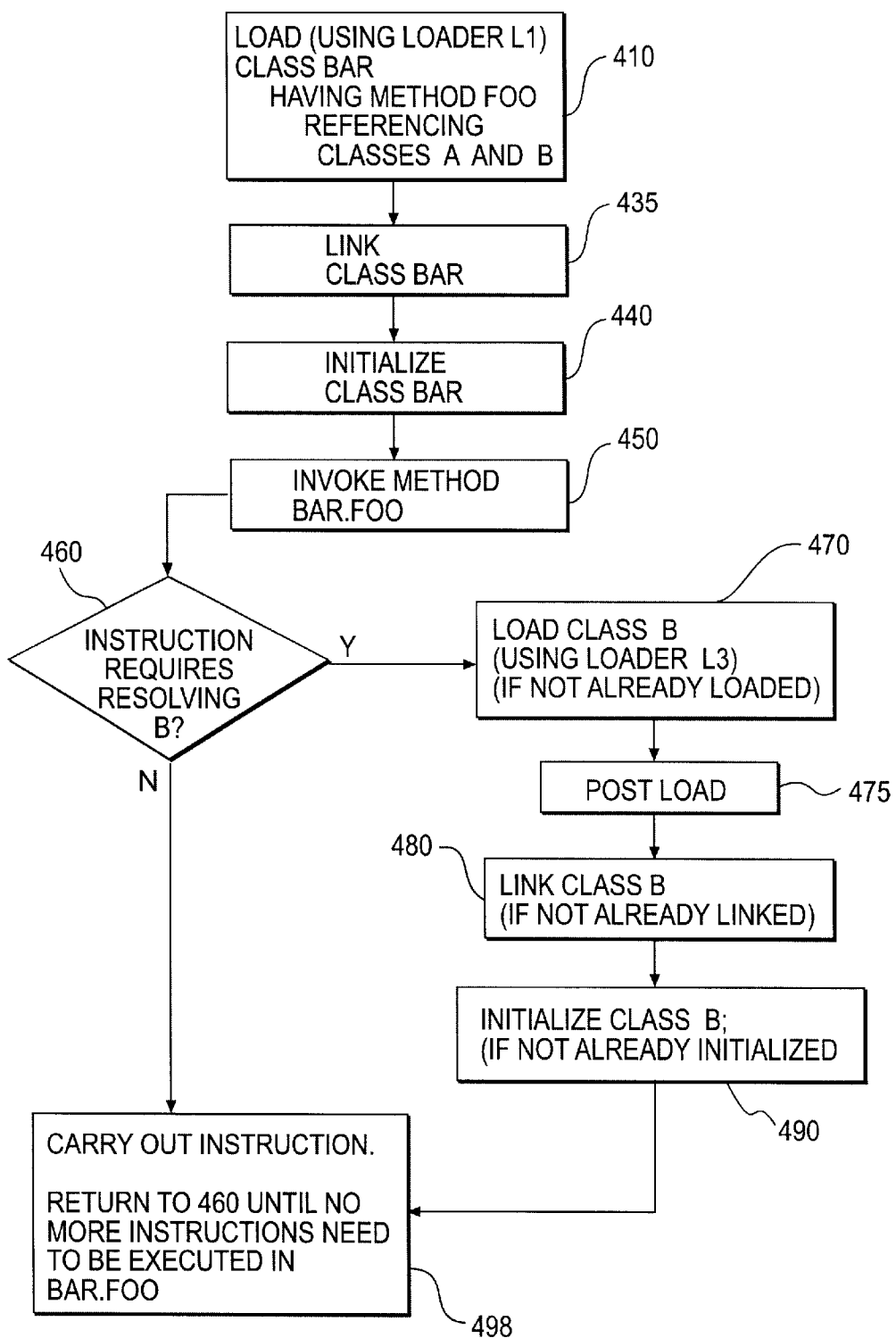
FIG. 4A is a flowchart depicting almost lazy loading of the example class BAR from FIG. 2.

In lazy loading, as illustrated in FIG. 4A, a class is not loaded until it is needed during execution. The advantage of this can be illustrated with the sample class BAR in FIG. 2. If arg is false, the assignment referencing classes A and B in the "if" branch is never made, and neither A nor B may need be loaded or linked. Thus processing is faster at run time with lazy loading.

For example, as shown in FIG. 4A, after loading class BAR with class loader L1 in step 410, classes A and B referenced by BAR are not immediately loaded. Instead, class BAR is verified during linking in step 435; and, if class BAR passes verification and linking, the JVM goes on to initialize class BAR in step 440. On the other hand, if class BAR does not pass linking and verification, then an error message is thrown (not shown) and execution is not attempted (not shown). After class BAR is initialized in step 440, the main method in class BAR is executed and eventually method FOO is invoked in step 450. If the variable arg is false, the "else" branch is taken in method FOO and neither class A nor class B is used. This is represented in FIG. 4A by the decision step 460 determining whether the current instruction requires resolving a reference to class B. If class B is not required, the current instruction is executed and execution continues with the next instruction looping back to 460 until no more instructions remain to be verified. If, on the other hand, variable arg is true, the "if" branch is executed. This branch contains the assignment in which the variable var of type class A is set to a new instance of class B. When the first instruction referencing B is encountered, a method of class B must be invoked (the constructor of B), and the reference to class B must be resolved. The test represented by step 460, asking whether B must be resolved for this instruction, is answered in the affirmative. Then, step 470 loads class B, if it is not already loaded, using class loader L3.

In the conventional JVM, processing simply continues where a Post Load step 475 is shown in FIG. 4A, and moves directly to step 480. Since a new instance of class B is being created, it must first be linked and initialized. So, the next step is for class B to be linked in step 480 if it has not already been linked. If class B passes linkage (including verification) in step 480, then in step 490 class B is initialized and then processing continues in step 498, in which the newly-resolved class B can be used by the current instruction.

This flow appears to be fully lazy in that a class is not loaded until it is needed to resolve a reference during execution. As will be shown later, however, according to the conventional JVM spec, the verifying step during linking 435 might require the loading of class B. In such a case, the process cannot be considered fully lazy; and the process is called almost lazy loading.

One problem identified during almost lazy loading illustrated in FIG. 4A, is class name ambiguity. When several classes are compiled together, the compiler generates a name space containing class names that are unique within the name space. However, when several classes are compiled at different times by different compilers, name uniqueness for a class cannot be guaranteed. At run time, class loaders may introduce multiple name spaces. As a result, a class type during run time is defined not by its name alone but rather by the combination of the class name and its defining class loader, e.g. <BAR,L1>. This circumstance can fool the verifier even in the conventional system where the verifying step loads all referenced classes needed to resolve types. During Linking 435, including verification, it is assumed that the referenced class, e.g. B, has the type that would be conferred by the current class loader, e.g., L1; that is, the "type" of class B is assumed to be <B,L1>. If this assumption is not true, then problems of access privileges can arise. For example, if B's class loader L3 is different than BAR's class loader L1, and if <B,L3> declares a variable to be private that <B,L1> declares to be public, then VM may allow access to the private variable from outside the class B and program security can be compromised.

Figure 4B:
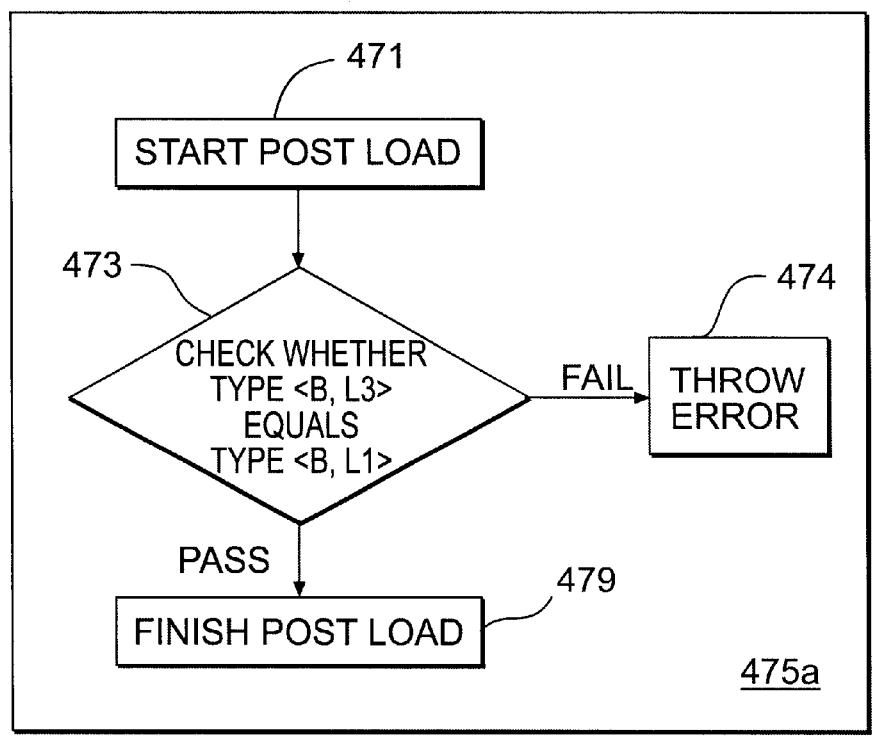
FIG. 4B is a flowchart depicting access-type checking employed in a recent update to the JVM for step 475 of the almost lazy loading depicted in FIG. 4A.

In the most recent version of the JVM spec, the second edition, released April, 1999, this problem is avoided as described in another related application, U.S. Ser. No. 09/134,477 Bracha and Liang, entitled METHODS AND APPARATUS FOR TYPE SAFE, LAZY, USER-DEFINED CLASS LOADING, also referenced above. FIG. 4B shows a flowchart illustrating the solution utilized in the second edition of the JVM specification. Using this solution, extra steps are included in the Post Load step 475. The step 473 determines whether class B, as actually loaded with L3, produces the type assumed based on the name and BAR's loader L1; i.e., step 473 determines whether <B,L3> equals <B,L1>. If loading B actually produces a type different from the type assumed, then class B fails the name/type constraint, and an error is thrown in step 474. Otherwise, execution continues in step 479. This process, described in the application cited immediately above, does not change the fact that the linking in step 435 might require loading the referenced classes A and/or B to check subtyping for their use by class BAR, as described below. Thus the cited patent application does not solve the problems interfering with providing fully lazy loading.

Figure 5A:
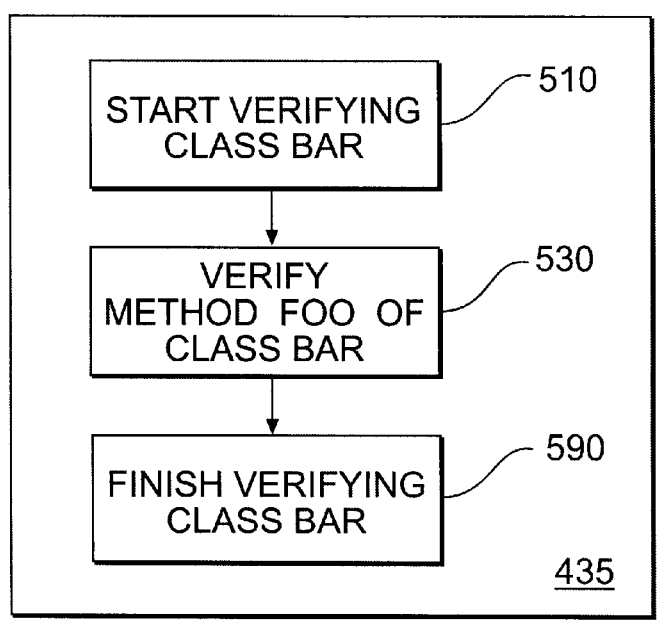
FIG. 5A is a flowchart depicting verification within the linking step 435 of FIG. 4A for the example class BAR of FIG. 2.
Figure 5B:
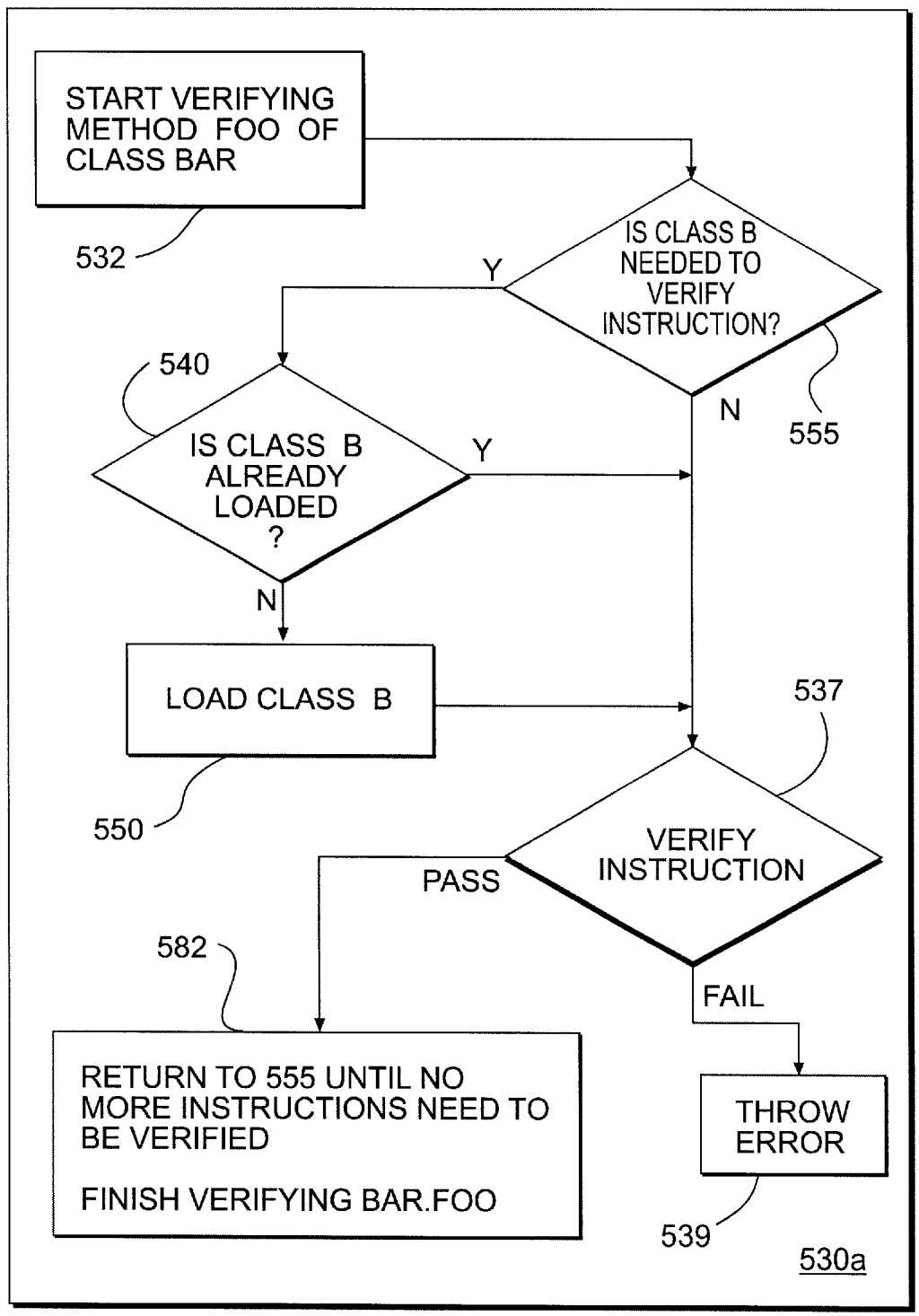
FIG. 5B is a flowchart depicting method verification during one embodiment of step 530 from FIG. 5A for the example class BAR from FIG. 2.
Figure 5C:
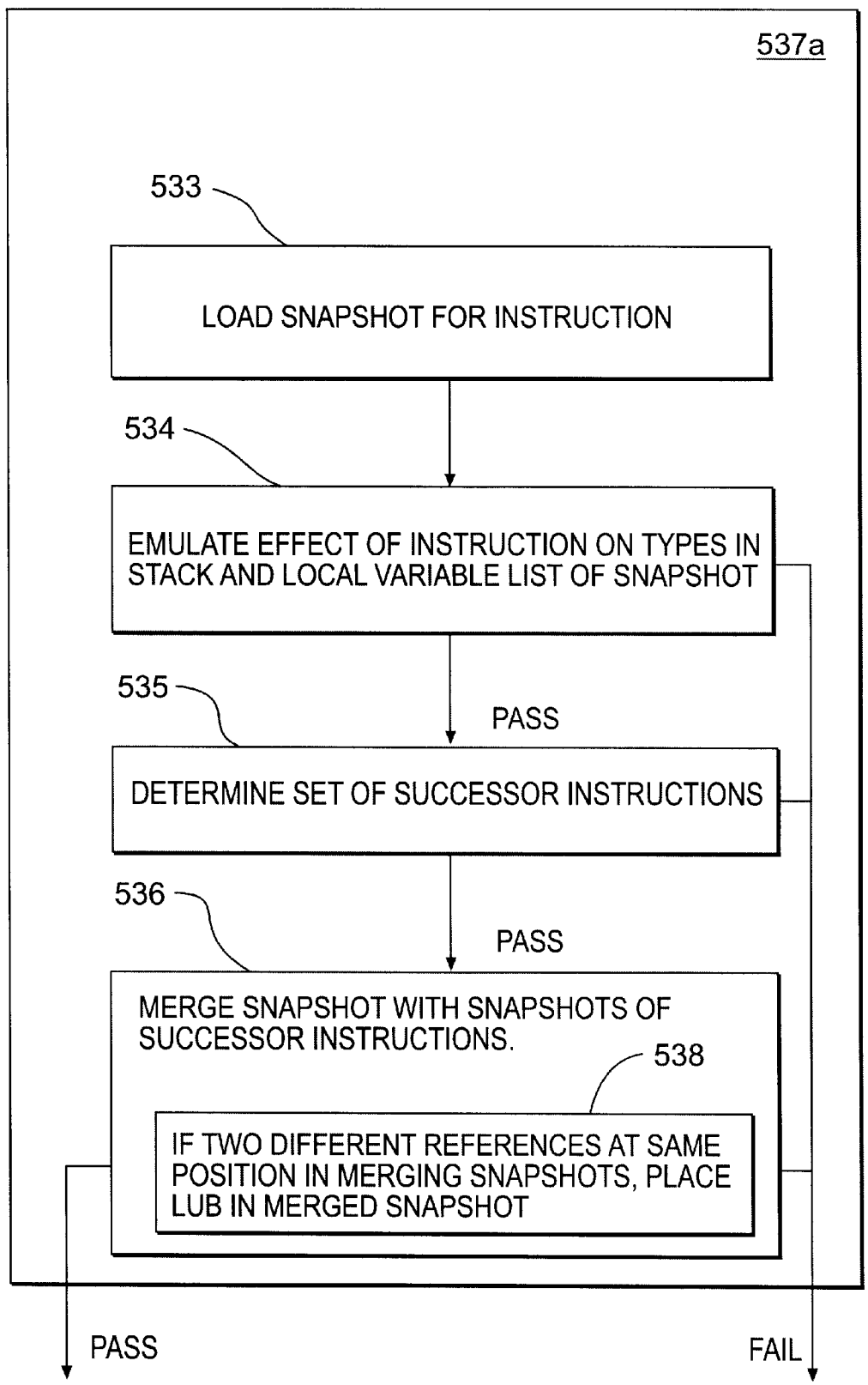
FIG. 5C is a flowchart depicting instruction verification within the verify instruction step 537 of FIG. 5B.

Verification steps within linking 435 of FIG. 4A are illustrated for the example using FIGS. 5A, 5B and 5C. FIG. 5A is a flowchart that shows that linking class BAR in step 435 includes starting verification of the current class BAR 510 followed eventually by a step 530 in which the method FOO of current class BAR undergoes verification. Subsequently, the verification of class BAR within step 435 is finished in step 590. The procedures employed during the conventional embodiment 530*a* of step 530 to verify method FOO of class BAR, are shown in FIG. 5B. The method starts in step 532. If the method references other classes such as A and B, and which are not yet already loaded, the verify process may need to load classes A and/or B. This first determination is made for each instruction in step 555. If referenced class B is needed, it is then determined whether class B is already loaded, step 540. If needed and not already loaded, the referenced class is loaded, step 550. Thus, even though lazy loading is desired, verification of methods may load other classes before the classes are actually needed during execution. As represented by step 537, if an incorrect subtyping relation between A and B or other verification problem is found during verification, a verification error is thrown in step 539. If the current instruction passes verification, the verification process continues to the end of the method in step 582 looping back to step 555 until no more instructions need to be verified. That is, a sufficient set of instructions are verified so that execution of the method may begin.

FIG. 5C shows some example details of verification that may be performed during step 537; for example, as performed in the JVM and described in U.S. Pat. No. 5,740,441, FIG. 4B. In this example, a type snapshot is maintained for each instruction. The type snapshot is a structure which holds the types for a list of local variables and for each position on an operand stack. When an instruction needs to be verified, its snapshot is loaded, step 533. In step 534 the effect of the execution of the instruction on the types in the snapshot is determined. When an instruction is a successor to multiple other instructions, such as when two branches of operations converge (as at the statement involving "z" in the example method BAR.FOO in FIG. 2), the type snapshot for an instruction must be merged with the snapshots of the predecessor instructions on each of the branches. This is accomplished while verifying an instruction by determining the successor instructions to the current instruction in step 535 and merging the snapshot of the current instruction with that of each successor in step 536. This merge will detect a verification failure if primitive types at the same locations in the snapshot don't agree. The merge also replaces references at the same position in the merging snapshots with the most specific common supertype (also called the lowest upper bound, LUB, or the least common supertype, LCS) in the resulting merged snapshot; and verification fails if this can not be done.

As shown by FIG. 5B, verification of a method that references other classes may prevent fully lazy loading because the verifier may have to load referenced classes. The loading of referenced classes is not assured—it depends upon the context in which the references are made. In the example, A must be a superclass of B for the assignment statement to be legal. This subtyping relationship can be checked by loading class B. If A is a superclass of B, A would have itself been loaded in the process of loading B. If A is not loaded after loading B, it cannot be a superclass B. If A is loaded, one can directly check if the relation holds.

Verification with Fully Lazy Loading

To achieve fully lazy loading with verification according to the present invention, it must be made possible to delay the checking of cross-module relationships that trigger loading according to conventional practice.

If, during the verification of example class BAR, B is already loaded, one can determine immediately if the subtyping relation holds. The supertype has either been loaded when loading B or else it cannot be a supertype of B. If class B is not already loaded, according to the present invention, a constraint is placed or imposed on class B which will be checked or enforced after class B is loaded, if ever. An example of this embodiment of the invention is illustrated in FIG. 6A through FIG. 6C.

Figure 6A:
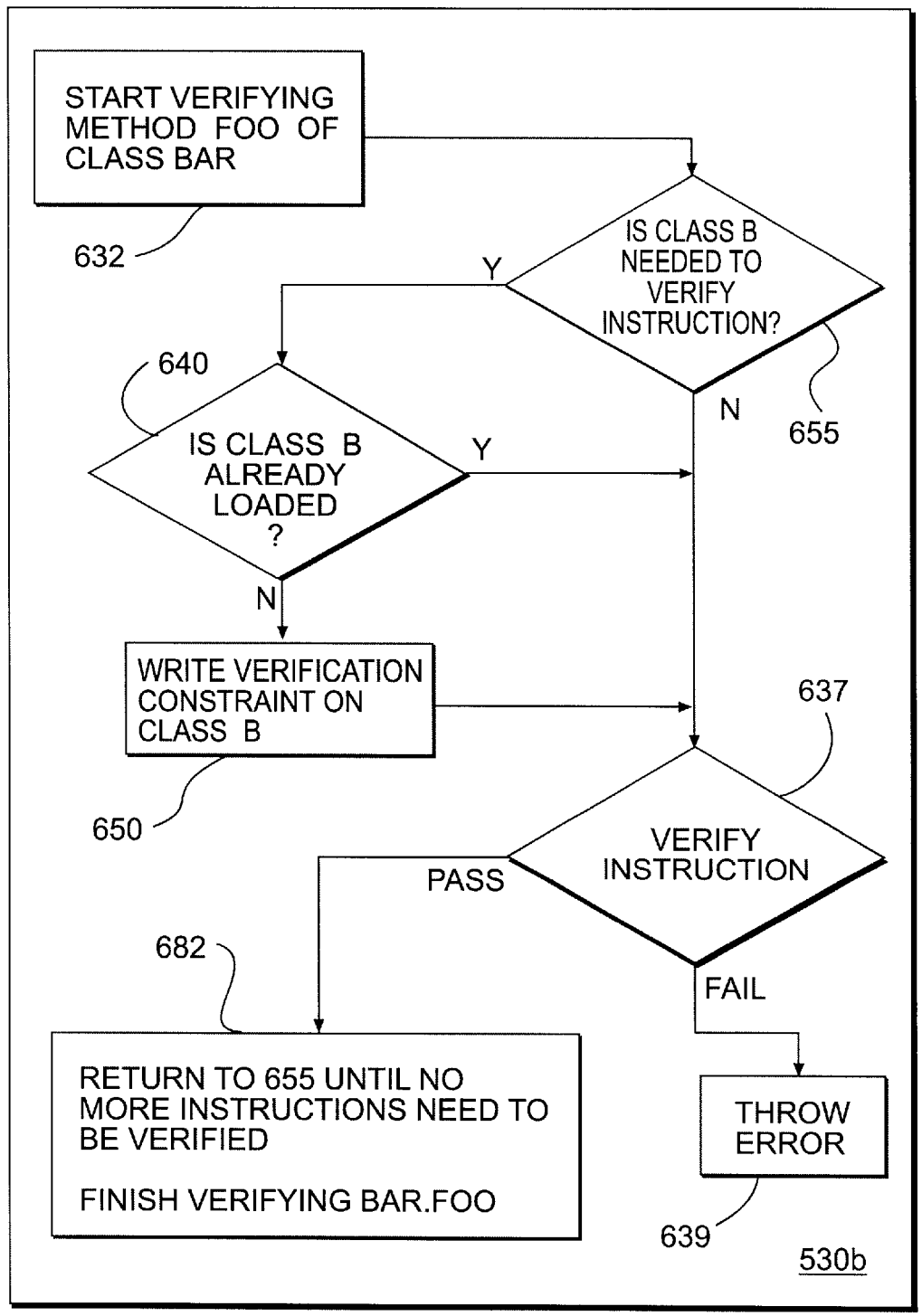
FIG. 6A is a flowchart depicting a method verification during an embodiment of the present invention for step 530 from FIG. 5A for the example class BAR from FIG. 2 which allows fully lazy loading.
Figure 6B:
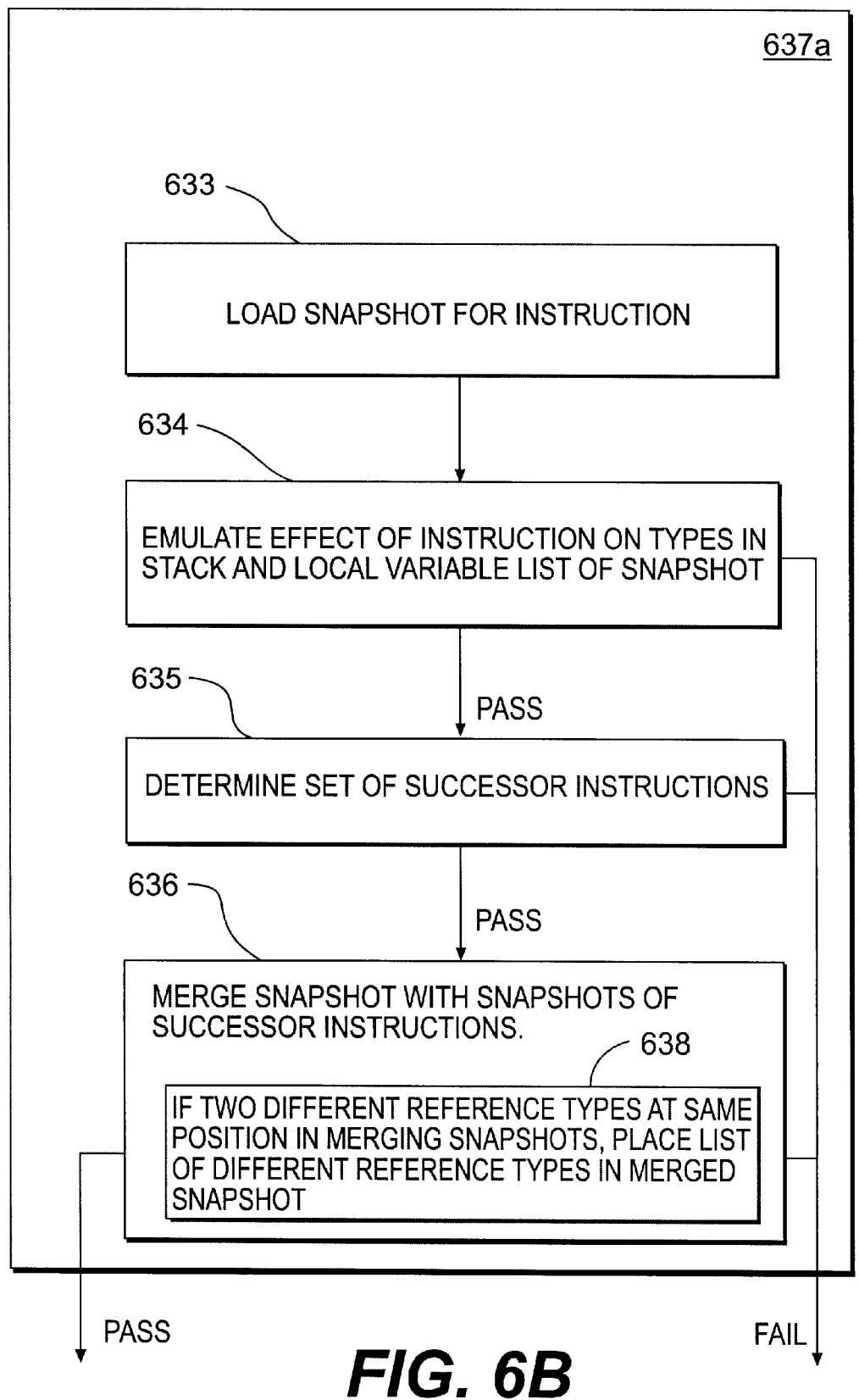
FIG. 6B is a flowchart depicting instruction verification within the verify instruction step 637 of FIG. 6A, according to an embodiment of the present invention.
Figure 6C:
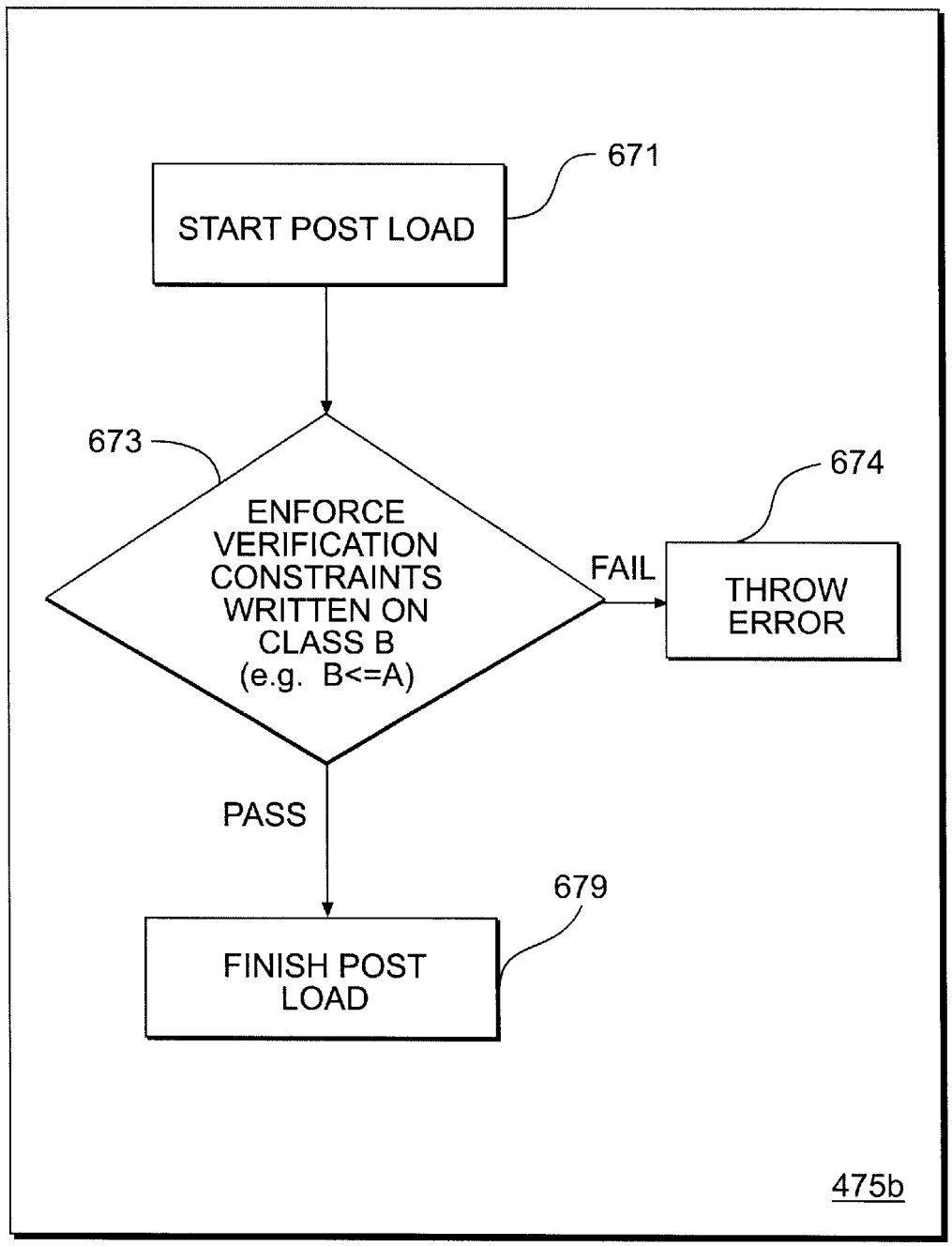
FIG. 6C is a flowchart depicting verification constraint checking according to an embodiment of the present invention during step 475 of FIG. 4A for the example class BAR of FIG. 2.

FIG. 6A is a flowchart for an implementation, 530*b*, for the method verification step 530 shown in FIG. 5A and is an alternative to the version 530*a* shown in FIG. 5B for the conventional JVM spec. According to this embodiment of the present invention, the method verification starts in step 632 and determines whether information about referenced class B of the type that conventionally triggered loading is needed, step 655. If referenced class B would conventionally trigger loading, the procedure next checks whether referenced class B is already loaded, step 640. If class B is already loaded then processing can continue as in the conventional JVM with checking the subtyping and other validity checks in step 637, and throwing the error in step 639 if an instruction fails verification. If the instruction does satisfy the validity checks including inter-module checks, then verification of method FOO continues, looping through sufficient instructions until no more instructions need to be verified to begin execution, step 682. If any instruction needed to begin execution fails verification, execution of the module would not begin.

However, if it is determined in step 640 that class B is not already loaded, the class loader for class B is not called to load class B at this time. Instead, verification constraints for class BAR's use of class B are written in step 650. Then it is assumed all cross-module checks on B, such as subtyping checks, are passed, and the verification of method FOO continues in step 682 as before. The circumstances that lead to writing constraints, and the form of those constraints, in step 650, are described in more detail later for the examples. According to this embodiment of the present invention, the verification step 530*b* during linking does: not interfere with the fully lazy loading of modules, as is desired.

Verification with Symbolic Computation of LUB

If a referenced module or class is not yet loaded, it remains not loaded during such fully lazy linking. In the JVM, this impacts the result of merging snapshots because the LUB inserted in step 538, illustrated in FIG. 5C, may not be known. Stated another way, the representation of the type lattice by the JVM may not be sufficiently populated to determine the LUB for the multiple different referenced types. FIG. 6B shows how the merge snapshots function is accomplished according to one embodiment of the present invention. Steps 633, 634, 635 and 636 are analogous to corresponding steps 533, 534, 535 and 536. However, in step 638, if the LUB is not known, its type cannot be inserted into the appropriate position of the merged snapshot. Instead, a list of referenced types at the appropriate fixed position in the snapshots of the predecessor instructions is inserted or otherwise associated with that fixed position in the merged snapshot. That is, instead of identifying and placing the reference to a LUB in the snapshot at this location by loading classes or modules as necessary to construct the type lattice, the several references to different types, e.g., class types $X_1, X_2, \ldots, X_n$, that cause the need for an LUB, are listed symbolically, perhaps separated by a sign or symbol such as a ^. A The symbol indicates the types must share this relationship of having an LUB.

Constraint Enforcement

The constraints written or otherwise recorded for use by the VM in steps 650 are enforced, e.g. checked, when and if referenced class B is actually loaded. Thus, the constraints are enforced immediately after loading during the Post Load step represented by step 475 in FIG. 4A. FIG. 6C illustrates the enforcement of verification constraints on referenced class B according to an example embodiment of the present invention. This embodiment of the invention represents a new process 475b that may include the steps of 475a illustrated in FIG. 4B. The enforcement begins at step 671. In the examples, the actual supertypes of B are used to determine whether B satisfies the subtyping verification constraints previously written. This check is made in step 673. If the referenced class B does not satisfy the constraints, then an error is thrown in step 674. The handler for this error may then terminate execution or allow execution to continue. Alternatively, execution may be terminated without throwing an error. If the referenced class B does satisfy the written constraints, then Post Load processing finishes in step 679.

With such modifications, a VM can implement fully lazy loading with verification. The advantages of imposing fully lazy loading include:

The behavior of a program with respect to linkage errors is the same on all platforms and implementations.

One need not anticipate all the places where a class or method might be linked and attempt to catch exceptions at all those places.

Users can determine the availability of classes or other modules in a reliable and simple way.

One of the advantages of the present invention is that a programmer can test for the availability of classes on a platform in a reliable and simple way. For example, if a programmer wishes to use modules of a newer release and use those newer modules only if they are available, then lazy linking makes that easier. Somewhere in the code produced by the programmer in this case will be a branch with a reference to the new modules of the new release. Execution of that branch would be designed by the programmer to not occur if the current version of the platform does not support the modules referenced in that branch. If the new module is not available on that platform, and the module being verified references the new module, a virtual machine which is not fully lazy may require the verifier to attempt to load the missing new module. This loading will necessarily fail, which will lead to failure of the verification step. Thus, verification will cause a failure due to a missing module even though the module is only referenced in a branch that would never be executed. With fully lazy loading required, verification will not fail due to modules referenced by instructions not actually executed. This ability to pass verification while checking for the latest releases of modules, such as classes, provides a significant motivation for adopting fully lazy loading, supported by the present invention, as a requirement of a virtual machine.

Even with required lazy loading, different implementations of a VM could be free to load and link earlier—provided that any failures manifest themselves only at the legal, defined points. The code must be able to execute up to the point when the class with the faulty type must be resolved. For example, a just-in-time (JIT) code generator may choose to prelink a class or method as it compiles it. However, if any of the linking fails, rather than failing immediately, the JIT should generate code that will cause the appropriate exception to be raised at the point lazy loading would have otherwise done so (it need not actually do the link time tests, though it can). As another example, a static compiler can fail during its proprietary link phase due to an invalid class reference. If, nonetheless, it chooses to compile code even though it cannot be completely linked, that code must fail when executed, at the same point as would code complied by the JIT. As a final example, when dynamically loading a class (e.g., through a class loader), an implementation may choose to prelink it, wholly or partially. However, if there are any failures, the code must again be able to execute up to the point of the invalid reference.

Module-by-Module Verification

In another aspect of the present invention, verification of a referenced module is not performed even if a referenced module is loaded. This module-by-module verification, also called one-module(class)-at-a-time verification, is desirable for a number of reasons. It allows verification to be performed before run time with beneficial consequences. The run time costs of verification in time and space can be reduced or removed altogether. Redundant or run-by-run verification can be obviated. The JAVA™ runtime environment can be smaller and simpler because the amount of code implementing verification it contains can be reduced. This one-module-at-a-time verification, implemented as an extension to the JAVA™ platform as class-by-class verification, is not automatically provided by either the conventional JVM specification, or the proposed fully lazy loading described above. In the first case, the verifier automatically loads referenced classes if needed with no option to avoid doing so. In the latter case, verification of the referenced class will occur if the referenced class is loaded and this verification is also performed with no option to avoid doing so. Thus, two embodiments of class-by-class verification are anticipated, one that can be used with the conventional JVM design and one that can be used with the new fully lazy loading design.

According to one embodiment of this invention, the checks usually performed during verification may be performed before run time. Because checks before run time are technically not part of linking and thus not part of the verification stage of linking, these checks are herein designated pre-verification, indicating potentially pre-run time checks of validity.

Figure 7A:
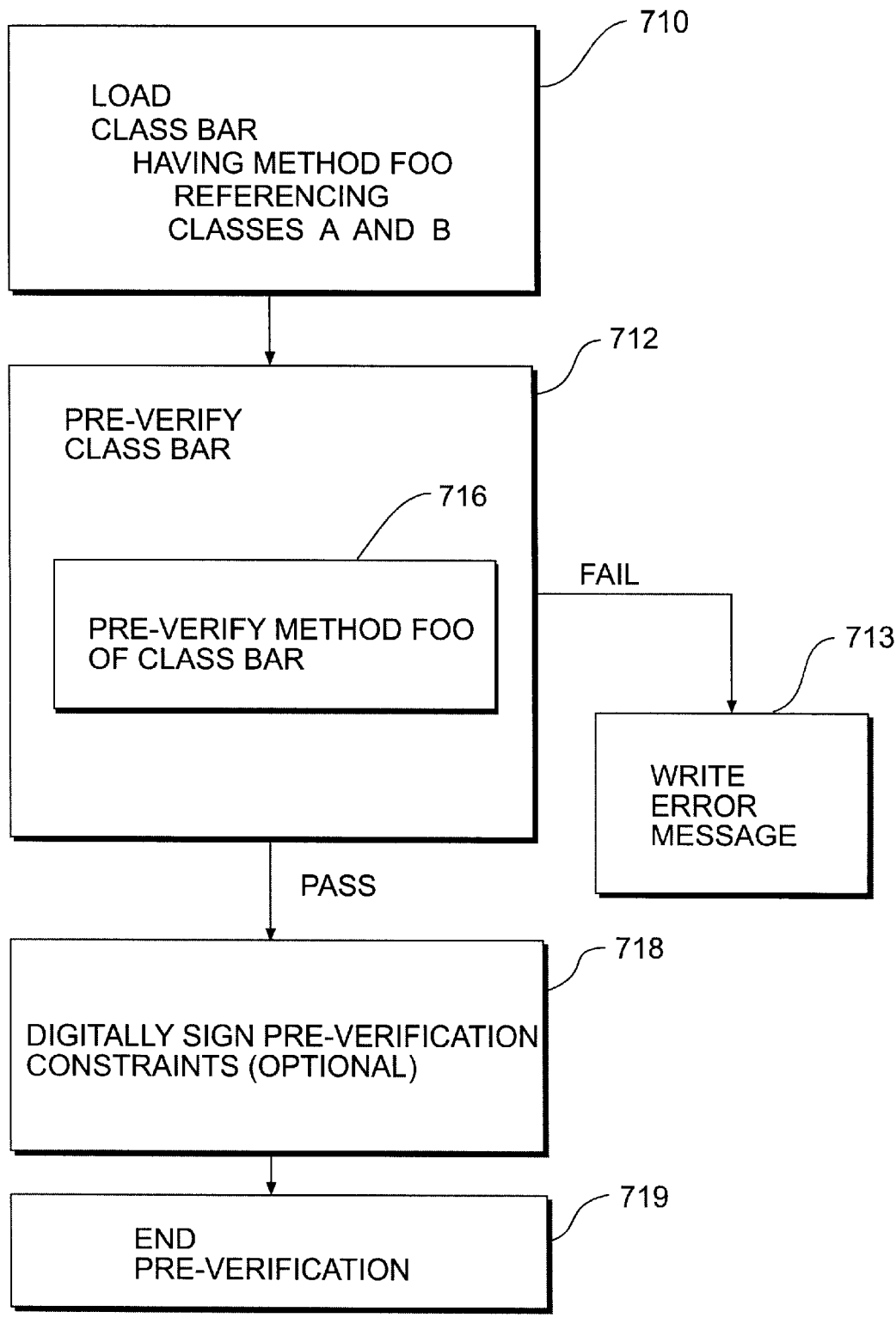
FIG. 7A is a flowchart depicting class-at-a-time pre-verification for the example class BAR from FIG. 2 according to the present invention.

In this embodiment, any time after a binary class has been generated by a compiler, the programmer can perform pre-verification on the binary class, and do so independently of any other classes that might be referenced in that class. As a consequence, access to a referenced class or referenced module is not required. This class-by-class pre-verification of the present invention is illustrated in FIG. 7A. The method begins, for example, with loading the class BAR from a storage medium into memory, step 710. Then in step 712 the validity checks are made, such as type checks and operand stack overflow/underflow checks, that would conventionally be made during verification. During such checks, any inter-module information needed for verification of instructions referencing other modules, such as subtyping relationships between classes A and B referenced from class BAR, is optimistically assumed so that instructions are valid. However, the assumed information or relationship places a constraint on the referenced module that must be remembered by the virtual machine. Such constraints must be checked if such a referenced module is ultimately loaded. If, in spite of these assumptions, the module such as class BAR does not pass the checks performed, an error results, step 713. As such an error is not necessarily a runtime error, it might not be thrown to a handler during execution. Instead, such an error might have to be communicated to the programmer, for example using an error message that appears on an output device such as a printer or display screen. If the module passes all the checks, then any pre-verification constraints to be recalled are written in step 716 for later use at run time. Subsequently, the process stops at step 719 when pre-verification is complete. Another class or module can then be pre-verified following the steps illustrated in FIG. 7A. Not all the instructions in a module may need to be pre-verified, just the instructions needed for a particular use of the module. For example, it may be necessary only to verify the instructions in method FOO, but not other methods in class BAR.

Optionally, the pre-verification constraints can be written to a file or otherwise associated with the module for checking later, at run time. For use with the JVM, these constraints could be recorded as data associated with the class in the binary class format on the storage medium. When the class is loaded into memory, these constraints could be internalized by the JVM for checking when it becomes necessary, for example, after loading of the referenced class B.

As a further option, according to this invention, the pre-verification constraints, however stored, or the module itself, or both, can have attached a signal, such as a digital signature, that can be used to reliably identify the source of the module or constraints and indicate whether they may have been tampered with since being signed.

In this manner, intra-module verification checks of validity tantamount to those performed during conventional verification, but not requiring cross-module information about referenced modules such as classes A and B, can be performed prior to runtime. That is, substantially complete module-by-module pre-verification can be performed for the intra-module checks. Inter-module checks are turned into pre-verification constraints.

Figure 7B:
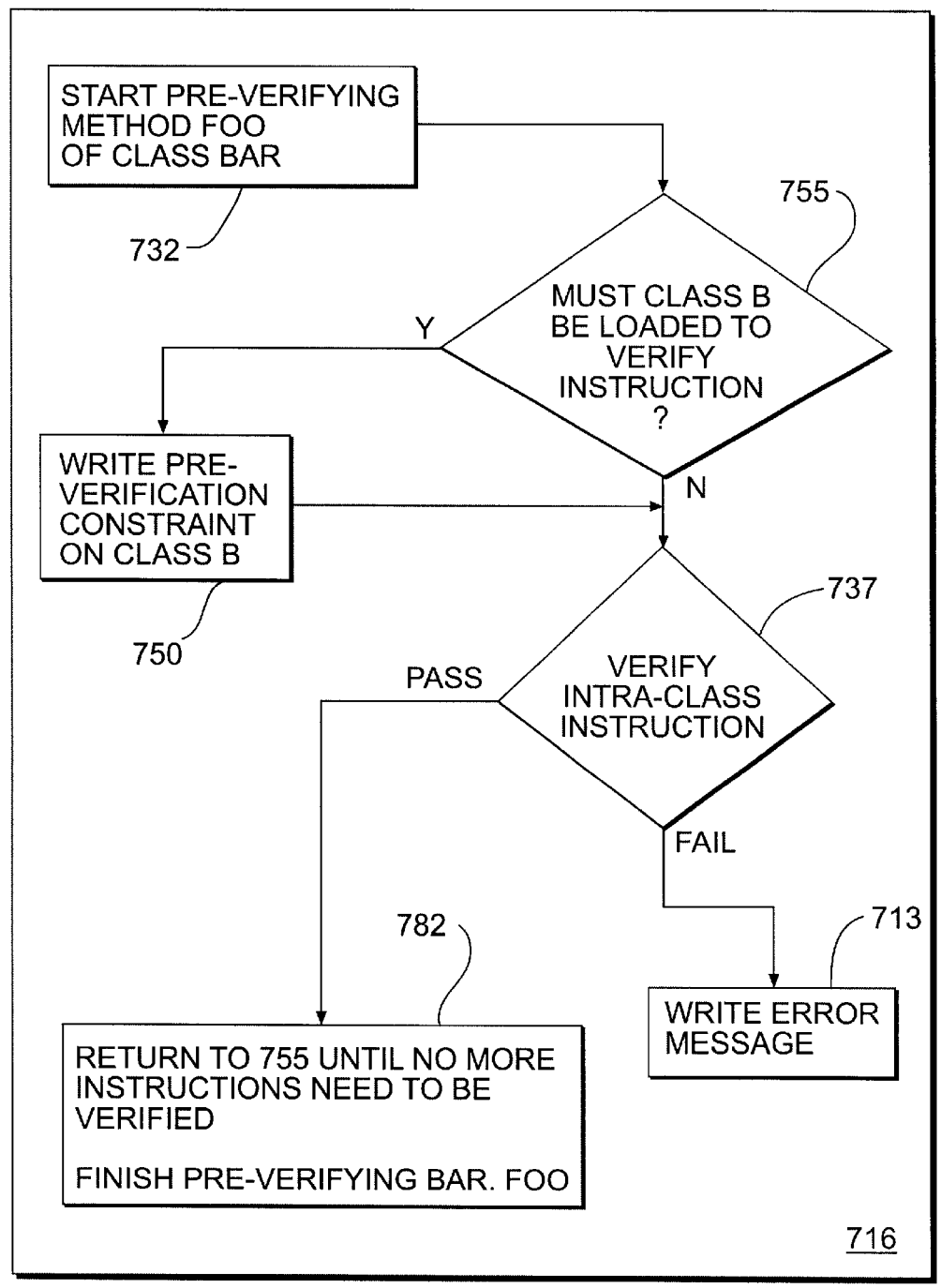
FIG. 7B is a flowchart depicting pre-verification of a method during step 716 of FIG. 7A.

FIG. 7B illustrates details of step 716 from FIG. 7A for the example case. The process starts pre-verification of a method of a loaded class BAR, step 732. Next, it is determined whether the next instruction in the method requires information from a referenced class B in order for the instruction to have its validity checked, step 755. If not, then the procedure performs any required intra-class validity checks on the instruction in step 737. If the instruction fails the intra-class check, an error message is written to an output device. The programmer may then deal with this problem. If, on the other hand, a referenced class would have to be loaded to fully verify this instruction, a pre-verification constraint is written or otherwise recorded in step 750 for later recall, and the subtyping relation required by the instruction is assumed valid. Since the instruction may also require intra-class checks, control goes to step 737 to perform those. If the instruction needs no intra-class checks, then it automatically "passes" the checks at step 737. If the instruction is found valid after an intra-class check and/or assumed valid after writing a pre-verification constraint, flow control shifts to step 782 which loops to step 755 until no more instructions remain in the method FOO of the loaded class BAR, at which time pre-verification of method FOO is finished. Note that no determination is made whether a referenced class is loaded; either an intra-module check is made or a pre-verification constraint is written. No cross-module checking is performed even with a module that is already loaded.

Figure 7C:
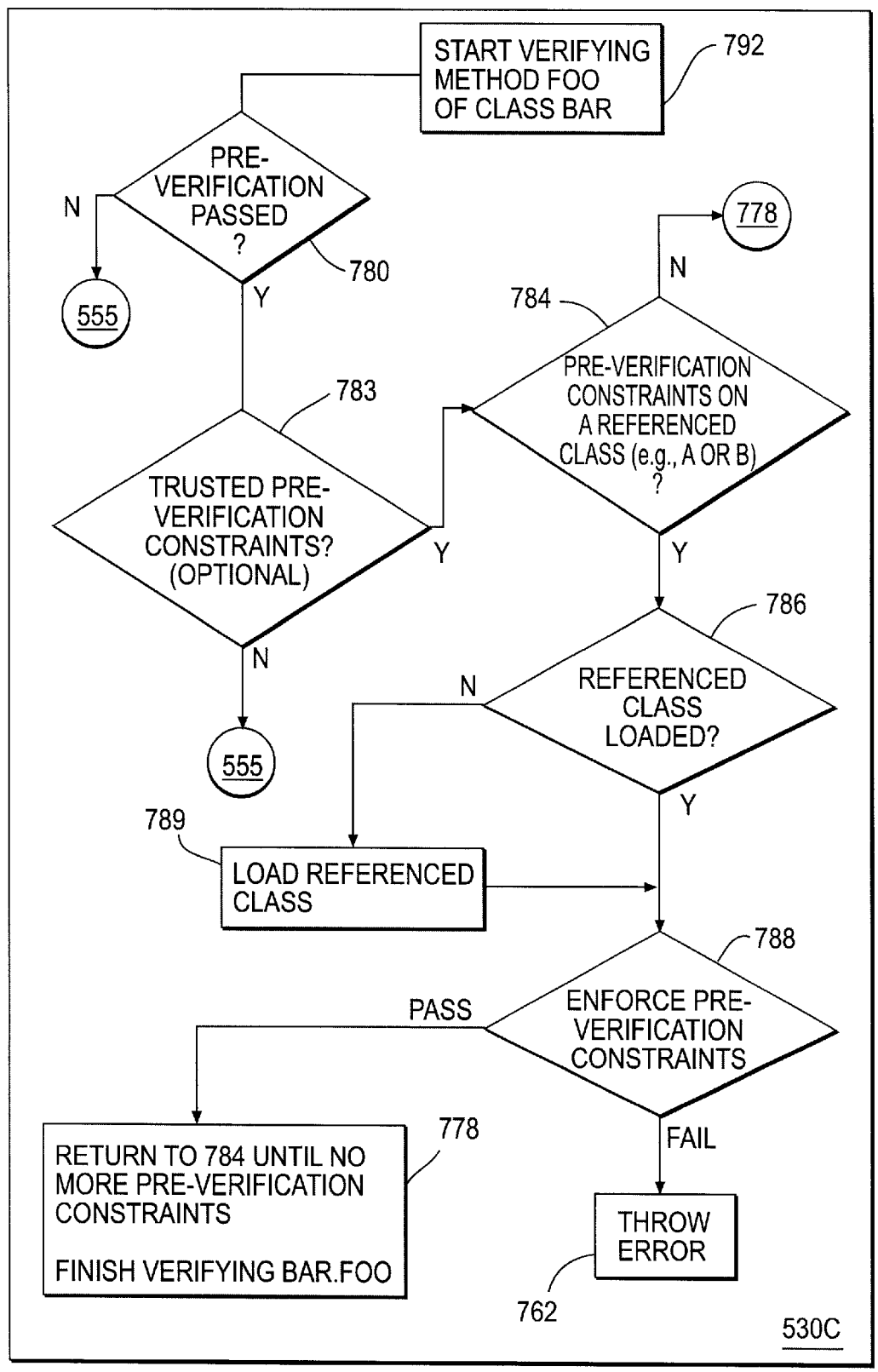
FIG. 7C is a flowchart depicting use of class-by-class pre-verification during step 530 in FIG. 5A, during verification at run time of the example class BAR from FIG. 2, according to one embodiment of the present invention.

FIG. 7C shows how a module, which has been verified one-module-at-a-time before run time, is handled by the verification performed during linking at run time, for the example class BAR. In place of either step 530a of the conventional JVM, or the modified step 530b for fully lazy loading, FIG. 7C shows an alternate step 530c that follows the almost lazy loading of the conventional JVM and incorporates class-by-class pre-verification. After starting the verification step for instructions of a module, such as method FOO of class BAR, in step 792, a determination is made whether the module has passed pre-verification in step 780. If not, control follows the flow of the conventional JVM starting at step 555 in FIG. 5B. Otherwise, after optionally checking whether the pre-verified module is to be trusted in step 783, described more below, control flows to step 784. A variety of ways are known in the art for testing whether a file is trusted, for example by using a digital signature. If there is no concern about the trustworthiness of pre-verified modules, step 783 can be skipped. At step 784, instead of stepping through the instructions in the method, the run time verifier reads the pre-verification constraints recorded/written during the class-by-class verification of BAR. If there were no pre-verification constraints written, verification of BAR.FOO is completed and control goes to step 778 to wrap up the process.

If a pre-verification constraint was written for a referenced module, e.g., classes A or B, then the run time verifier determines whether the referenced module in the constraint is already loaded, step 786. If it is, the pre-verification constraint is enforced in step 788. If the referenced module fails the constraint, an error is thrown for catching by an error handler, step 762. Otherwise control goes to step 778 which loops through the pre-verification constraints until none remain. If, in, step 786, it is determined that the referenced module, such as a referenced class, is not loaded, then the referenced module, such as a class, is loaded in step 789, and the constraint is enforced in step 788.

So long as the class has been pre-verified (and optionally, passes trust checks), whether pre-verification constraints were written on a referenced class or not, no intra-class checks need be performed; they were already done during the class-by-class pre-verification before run time. According to the present invention, then, after a module passes one-module-at-a-time pre-verification, run time verification does not perform intra-module checks; it only enforces inter-module constraints.

In the example described, a module is pre-verified as soon as it is compiled, without loading any other module. This allows for much of verification to be done before run time and not repeated every time a module is loaded and linked, thus saving valuable time and space resources (e.g. on processors running the virtual machine).

Module-by-Module Pre-Verification with Fully Lazy Loading

Figure 8:
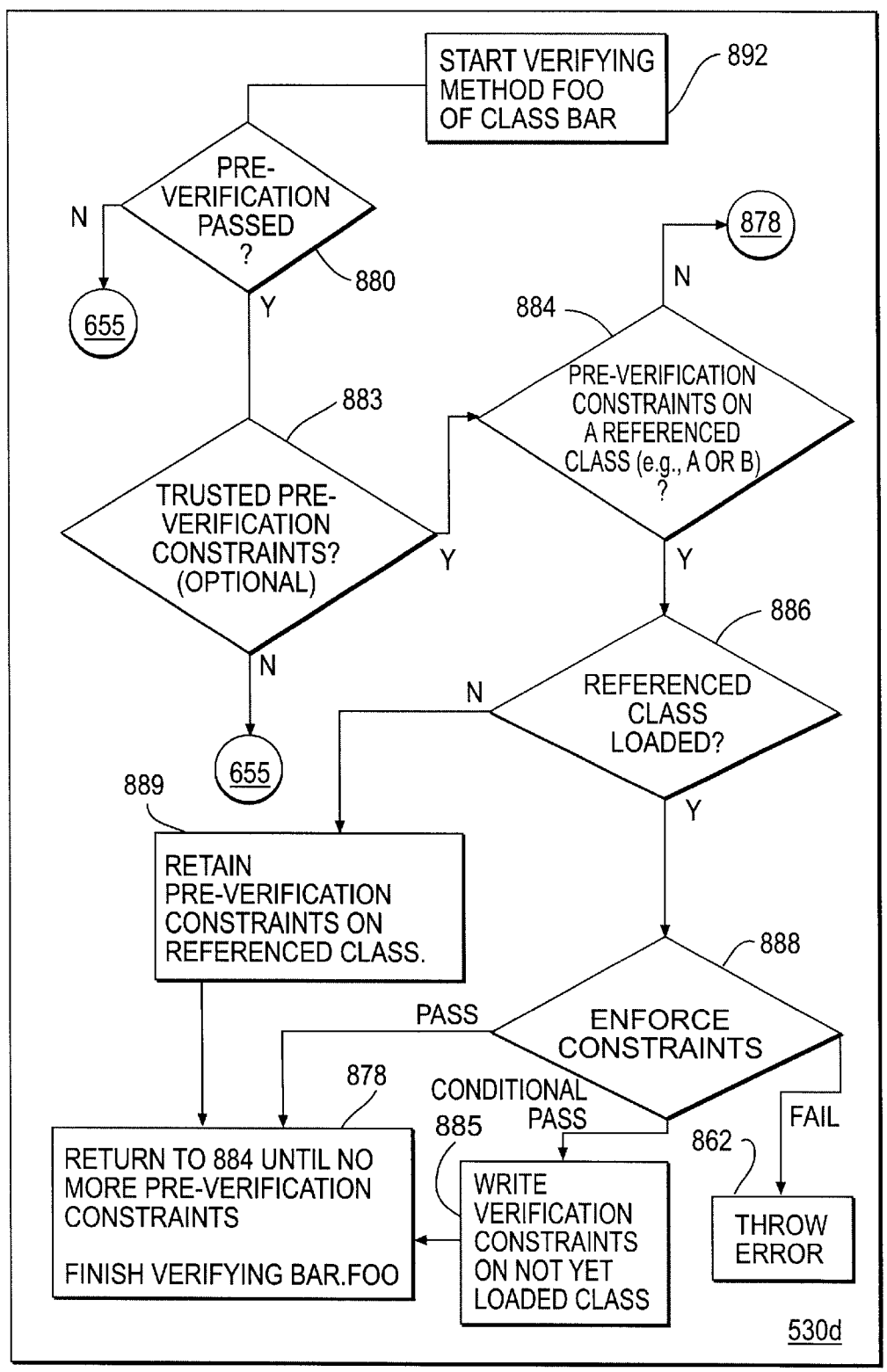
FIG. 8 is a flowchart depicting use of class-by-class pre-verification during another embodiment of the present invention for step 530 from FIG. 5A which allows fully lazy loading with class-by-class pre-verification of the example class BAR from FIG. 2.

FIG. 8 depicts a flowchart that incorporates the results of pre-verification during fully lazy loading at run time. FIG. 8 shows how a module, which has been verified one-module-at-a-time before run time, is handled by the verification performed during linking that supports fully lazy loading, for the example class BAR. In place of either step 530*a* of the conventional JVM, or the modified step 530*b* for fully lazy loading, or the step 530*c* for almost lazy loading with one-module-at-a-time verification, FIG. 8 shows an alternate step 530*d* that follows the fully lazy loading of a new embodiment of the JVM and incorporates class-by-class pre-verification. Steps 892, 880, 883, 884, 878, 886 and 862 in FIG. 8 are analogous to steps with corresponding seven hundred numbers in FIG. 7C, 792, 780, 783, 784, 778, 786 and 762, respectively. After starting the verification step for instructions of a module, such as method FOO of class BAR, in step 892, a determination is made whether the module has passed pre-verification in step 880. If not, control follows the flow of the fully lazy loading JVM starting at step 655 in FIG. 6A. After optionally checking whether the pre-verified module is to be trusted in step 883, described above, control flows to step 884. At step 884, instead of stepping through the instructions in the method, the run time verifier reads the pre-verification constraints written during the class-by-class verification of BAR. If there were no pre-verification constraints written, verification of BAR.FOO is completed and control goes to step 878 to wrap up the process.

If a pre-verification constraint is read for a referenced module, e.g., classes A or B, then the run time verifier determines whether the referenced module in the constraint is already loaded, step 886. If it is, the pre-verification constraint is enforced in step 888. If the referenced module fails the constraint, an error is thrown for catching by an error handler, step 862. If the referenced module passes the constraint without qualification, flow goes to step 878 which loops through the pre-verification constraints until none remain.

The remaining steps in FIG. 8 for fully lazy loading differ substantially from their counterparts for almost lazy loading. If, in step 886, it is determined that the referenced module, such as a referenced class, is not loaded, then the referenced module is not loaded. Instead, the pre-verification constraint is copied to, or otherwise retained in, a memory or storage medium, step 889, to be enforced when the not yet loaded module, such as a class, is loaded, if ever.

In FIG. 8, the enforcing of step 888 may have three results. Besides failure and passing without condition, it is possible that the already loaded referenced module can pass only if the contents of one or more other not yet loaded modules are known. This result can be considered as "passing subject to a condition" that the pre-verification constraint on several referenced modules be re-written as a verification constraint on the not yet loaded referenced module or modules. Step 885 rewrites the pre-verification constraint as a verification constraint only on the not yet loaded referenced modules, such as classes. After the rewrite, if needed, control goes to step 878.

Module-by-Module Verification of Untrusted Classes

As mentioned above, verification according to the present invention relies on the ability to construct and annotate a module with constraints that must be satisfied by referenced modules. Unfortunately, the procedures do not always prevent an attacker from spoofing such annotations—possibly making a malignant class appear benign. Therefore, the optional trusted check is included in FIG. 7C at step 783 and in FIG. 8 at step 883 according to one embodiment of the present invention. Absent these checks, pre-verification can be used in trusted situations, for instance where the classes can be pre-verified and loaded into a trusted (tamper proof) database prior to execution.

Figure 9:
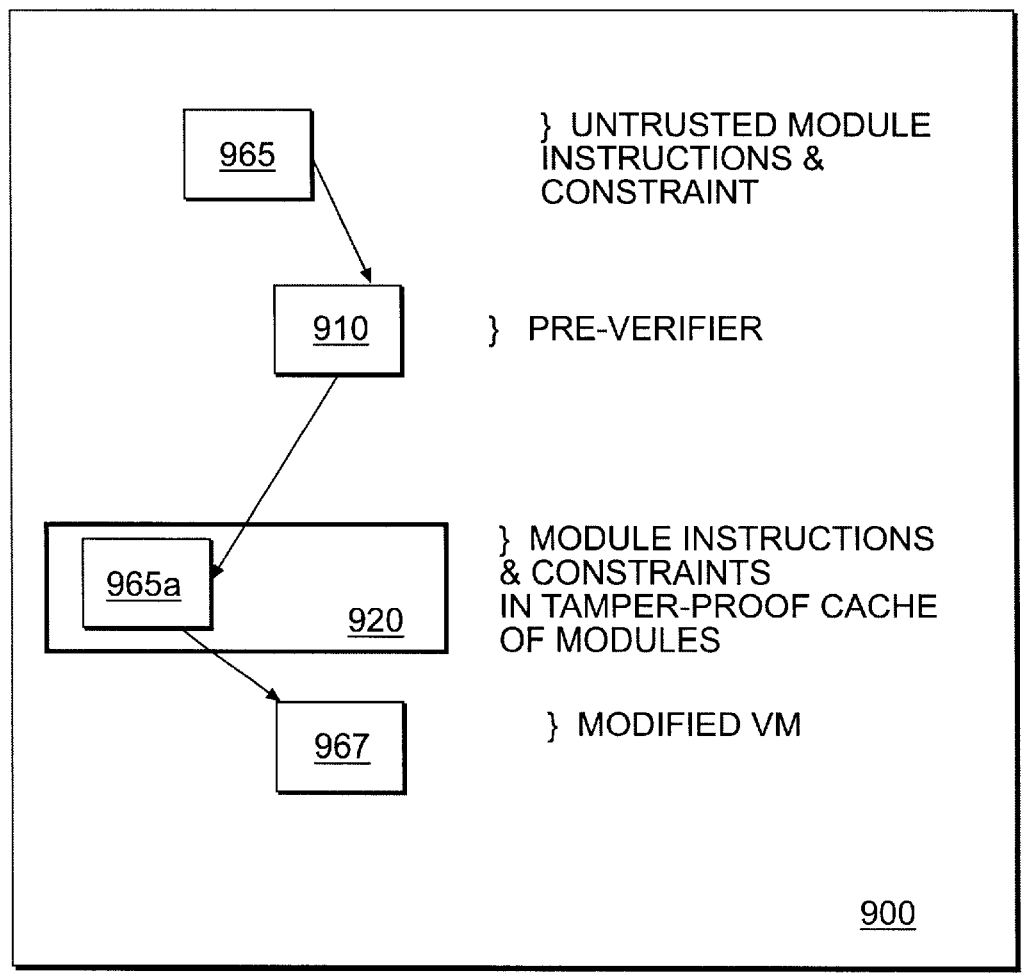
FIG. 9 is a block diagram of a computer configured for pre-verification with a cache for trusted classes and verification constraints, according to another embodiment of the present invention.

In untrusted situations, however, more protection is needed. According to an embodiment of the present invention, a cache is created as shown in FIG. 9. The cache 920 would contain trusted modules, such as trusted classes and/or pre-verification constraints, e.g. 965*a*. Modules and/or constraints imported to a virtual machine from an untrusted source, for example a source on the Internet, would be placed outside the cache, e.g., at 965. Any pre-verification constraints coming with the class from the untrusted source, e.g. 965, would be ignored. Instead, the first time such a module is loaded it is eagerly pre-verified in a pre-verifier 910 according to the method depicted in FIG. 7A. If the module fails pre-verification, it will be rejected immediately. If the module does not fail pre-verification, new pre-verification constraints are generated as needed and the module annotated, or associated with, the new constraints, e.g. 965*a*, is then stored in a trusted module cache 920. On subsequent attempts to load the module from an untrusted source, the module cache 920 will be searched first. If the cached, pre-verified module 965*a* is found, the module 965*a* can then be safely used as pre-verified. With this modification, checking of class-by-class pre-verification constraints as shown FIG. 7B will proceed correctly. In effect, step 780 of FIG. 7C answers the question about whether pre-verification has been performed by checking the module cache. With this modification, the digital signing of the pre-verification constraints, step 718 in FIG. 7A, is not needed. Similarly, with this modification the check of whether the pre-verification output is trusted shown in step 783 of FIG. 7C and 883 of FIG. 8 is also not needed, and flow proceeds directly from step 780 or 880 to step 784 or 884, respectively.

Forms of Constraints

The methods illustrated in flowcharts in FIGS. 6A, 6C, 7A, 7B and 8 all provide elements for checking referenced classes as late as possible. The form of the constraints written, and the manner in which those constraints are subsequently checked is as follows. The constraints may be written, for example, in step 650 of FIG. 6A, step 750 of FIG. 7B, and steps 885 and 889 of FIG. 8. Enforcing of the constraints can be applied in step 673 of FIG. 6C and step 788 of FIG. 7C and step 888 of FIG. 8.

Constraint generation and constraint checking will be described in more detail by example. Referring to FIG. 2, the assignment statement states that a new instance of class B will be stored in the variable var of class type A. In an object oriented language, this assignment requires that B be a subtype of class A, as represented by the expression B<=A. This is not known during verification of BAR unless B is loaded at that time. If B is loaded and B is a subclass of A, then A must also be loaded (because A had to be loaded to load B). Therefore, the contrapositive is true, that is, if B is loaded and A is not loaded, then B is not a subclass of A; the assignment statement causes a subtyping mismatch which causes class BAR to fail verification. If both A and B are loaded, as in eager loading shown in FIG. 3, then the indicator of the superclass for B can be traced to see if A is somewhere a superclass of B. If so, B is a subclass of A and this assignment passes verification. If A is not found by following the superclass indicators up the hierarchy, then B is not a subclass of A; the assignment statement causes a subtyping mismatch, and class BAR fails verification.

Using the conventional JVM specification, if class B was not loaded already, the verifier would load class B and check its type, specifically whether it is a subtype of class A.

According to the present invention, in order to achieve fully lazy loading, or class-by-class verification, or both, it is desired not to load class B. Therefore, according to this embodiment of the present invention, B is not loaded; and, instead, a constraint B<=A is written. This constraint can be written in any of the steps listed above for writing constraints (e.g. 650, 750, 889, 885). Later when BAR.FOO is executed, if this branch with the assignment statement is not executed, and B is not likewise referenced from any other instruction that is executed, class B is never loaded. But if the branch including this assignment statement is executed and B is not yet loaded, class B will be loaded at that time, and, at that time, after class B is loaded, the check will be made whether class B satisfies the constraint B<=A. This checking can be performed, as, for example, in the steps listed above for checking constraints (e.g. 673, 788, 888). This will be easy to do because if class B is indeed a subclass of class A, and inherits its attributes from class A, then class A would have to have been loaded already.

Thus a constraint of this type allows fully lazy loading, class-by-class pre-verification, or-both.

There is another check on class type of non-local classes that may be treated differently in class-by-class pre-verification than it is treated in the fully lazy loading implementation, according to the present invention. This is the receiver access check for protected members:

In the JAVA™ virtual machine, a protected member R may be accessed by a class or interface D if and only if:
1. D is in the same run time package as the class C that declared R OR BOTH
2. D is a subclass of C, the class that declared R, AND
3. if R is an instance member, then T, the static type of the instance R being accessed, is a subtype of D.

Requirement 3 is known as the receiver protected check.

In a conventional JAVA™ virtual machine, the first two requirements are checked when the reference from D to R is resolved during linking of D, while the third requirement is checked during verification of D. During verification, the class C that declares R may not have been loaded yet. In this case, it is evident that C is not a superclass of D (otherwise, C would per force have been loaded, because loading a class implies the loading of all its superclasses). In that case, the access is only legal if C and D are in the same run time package. The verifier can optimistically assume that this holds. The requirement will be checked when the reference is resolved. Hence, the verifier only needs to perform the protected receiver check if C has already been loaded. In this situation, it is possible to determine whether R is a protected member at all. If R is not protected, no protected receiver check is necessary. If R is protected, the verifier can test to see whether D is in the same run time package as C. If this is the case, the access is legal and again, no protected receiver check is needed. If D and C are not in the same run time package, the verifier can check whether D is subclass of C and whether T, the static type of the instance being accessed, is a subtype of D. If not, an error is raised. Note that the check T<=D may require loading of T if it has not already been loaded.

In verification with fully lazy loading, when verifying D, its superclass is assumed to have been loaded. Control proceeds in the same manner as in the non-lazy case, with one exception. If it is determined that a check if T<=D is needed, and T is not loaded, loading must be avoided. Instead, the loading constraint T<=D is imposed on T.

In class-by-class verification, the situation is different. Neither the superclass of D nor the class C that declared R have been loaded. Therefore, the protected receiver check can not be performed. The assumption that if C is a superclass of D, it must have been loaded cannot be made, hence the declaration of R cannot be examined. It follows that it cannot even be determined whether R is protected or not. Instead, appropriate constraints must be generated that will be checked at a later time, when the program executes. This problem can be solved by generating the conditional constraint:

If (D<=X) then {if (X.m protected) then {T<=D} else {true}} else {true} for every instruction of the form:

invoke o, X.m, where o has type T. A similar strategy applies to field references. This constraint is examined prior to the initialization of D. At that point, D<=X can be decided (since D and all its superclasses have already been loaded). If D<=X is not true, no further action is necessary. If D is not a subclass of X, then D cannot possibly be a subclass of C, the class that declared m. The reason is that C must necessarily be a superclass of X. It follows that the reference to X.m is only legal if either m is not protected or C is in the same run time package as D. This will be checked when the reference to X.m. is resolved. If it is true that D<=X, then it can be checked whether X.m is protected or not. If X.m is not protected, the protected receiver check need not be done. Otherwise, the test if T<=D can be made which, as above, may cause T to be loaded.

When combining fully lazy verification with class by class verification, the procedure for class-by-class verification is followed, except that when evaluating the conditional constraint:

if (D<=X) then {if (X.m protected) then {T<=D} else {true}} else {true} if one must evaluate T<=D and if T is not loaded, one should impose the loading constraint T<=D on T, as in the lazy case.

Another constraint is appropriate when verification examines the state of the operand stack at a statement that is a successor statement to several prior executed statements, i.e., where two or more branches converge. At this point, the verification is currently designed to merge the snapshots of the operand stack and local variables from the preceding instructions to which the current instruction is a successor. If the references are to types defined in classes that are not yet loaded, which will always be the case in class-by-class pre-verification and sometimes the case in fully lazy loading, the type lattice is not available and the LUB is not known. Following the symbolic representation of an LUB described above for step 638 of FIG. 6B, a constraint such as "the LUB<=class T" can be replaced by a constraint on a list represented symbolically as:

$X_1 \char`\^ X_2 \char`\^ \ldots X_n <= T$

This can be factored out into a series of constraints on individual classes $X_i$ as follows:

$X_1<=T, X_2<=T, \ldots X_n<=T.$

When the current method of a loaded class is executed and goes through a branch that requires resolution of class $X_2$, for example, then class $X_2$ is loaded and the constraint $X_2<=T$ can be checked at that time. Alternatively, a constraint on the list can be rewritten dropping $X_2$ from the list, if $X_2$ passes the check when $X_2$ is loaded.

As described above, the constraints are written during any of several steps (e.g. 650, 750, 889, 885) and the constraints are then checked at any of the several checking steps (e.g. 673, 788, 888).

With this symbolic representation of the LUB, the actual computations may take longer to converge. However, the process is guaranteed to converge because the constant pool of a class file of the JVM is finite. Hence, only a finite number of types can be referenced by a method, directly or indirectly. As a result, the symbolic representation of an LUB must be a finite sequence of class names $X_1\hat{}\ldots\hat{}X_n$. In turn, this means that the number of iterations through the type inference algorithm is finite for the JVM, since iterations continue until no new types can be added to the LUB.

Conclusion of Detailed Description

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for verifying instructions in a module of a computer program, one-module-at-a-time, the method comprising:

for each instruction in a first module, determining whether an instruction in the first module requires information in a referenced module different than the first module to verify the instruction, writing a pre-verification constraint for the referenced module without requiring access to the referenced module based on a determination that the information is required, and performing any intra-module check required for the instruction after the pre-verification constraint has been written, wherein an intra-module check is performed, if needed, when the information is not required; and providing a message when an the instruction of the module fails to satisfy any intra-module check.

2. A method for verifying instructions of a module of a computer program during linking, the method comprising:

determining whether a first module which is loaded has passed pre-verification one-module-at-a-time;

reading a pre-verification constraint on a constrained module, if any, based on a determination that the first module has passed pre-verification;

determining whether the constrained module is loaded based on a determination that any pre-verification constraint is read;

enforcing the pre-verification constraint based on a determination that the constrained module is loaded; and loading the constrained module and enforcing the pre-verification constraint based on a determination that the constrained module is not loaded.

3. The method of claim 2, said enforcing the pre-verification constraint further comprising sending an error message if the constrained module fails to satisfy the pre-verification constraint.

4. The method of claim 2, further comprising, if the constrained module passes the pre-verification constraint during said enforcing, returning to reading a pre-verification constraint on a constrained module until all pre-verification constraints are read.

5. The method of claim 2, further comprising, if the constrained module passes the pre-verification constraint during said enforcing, returning to reading a pre-verification constraint on a constrained module until all pre-verification constraints are read, whereby the first module is verified.

6. A computer program product for verifying instructions in a module of a computer program, one-module-at-a-time, the product comprising:

a computer readable storage medium;

computer controlling commands, stored on the computer readable storage medium that, for each instruction in a first module, determine whether an instruction in the first module requires information in a referenced module different than the first module to verify the instruction, write a pre-verification constraint for the referenced module without requiring access to the referenced module if the information is required, and perform any intra-module check required for the instruction after the pre-verification constraint has been written, wherein an intra-module check is performed, if needed, when the information is not required; and that provide a message when an the instruction of the module fails to satisfy any intra-module check.

7. A computer program product for verifying instructions in a module of a computer program during linking, the computer program product comprising:

a computer readable storage medium;

computer controlling commands, stored on the computer readable storage medium, for determining whether a first module which is loaded has passed pre-verification one-module-at-a-time, for reading a pre-verification constraint on a constrained module, if any, based on a determination that the first module has passed pre-verification, for determining whether the constrained module is loaded based on a determination that any pre-verification constraint is read, for enforcing the pre-verification constraint based on a determination that the constrained module is loaded, and for loading the constrained module and enforcing the pre-verification constraint based on a determination that the constrained module is not loaded.

8. The computer program product of claim 7, further comprising computer controlling commands, stored on the computer readable storage medium, for sending an error message if the constrained module fails to satisfy the pre-verification constraint while enforcing the pre-verification constraint.

9. The computer program product of claim 7, further comprising computer controlling commands, stored on the computer readable storage medium, for returning to reading a pre-verification constraint on a constrained module, if the constrained module passes the pre-verification constraint during said enforcing, until all pre-verification constraints are read.

10. The computer program product of claim 7, further comprising computer controlling commands, stored on the computer readable storage medium, for returning to reading a pre-verification constraint on a constrained module, if the constrained module passes the pre-verification constraint during said enforcing, until all pre-verification constraints are read, whereby the first module is verified.

11. A pre-verification apparatus for verifying a module one-module-at-a-time, the apparatus comprising:

a computer readable storage medium for storing a module of a computer program and a constraint;

a processor configured to: for each instruction in a first module, determine whether an instruction in the first module requires information in a referenced module different than the first module to verify the instruction, write a pre-verification constraint for the referenced module without requiring access to the referenced module if the information is required, and perform any intra-module check required for the instruction after the pre-verification constraint has been written, wherein an intra-module check is performed, if needed, when the information is not required; and provide a message when an the instruction of the module fails to satisfy any intra-module check.

12. A verification apparatus for verifying a module during linking, the apparatus comprising:

a computer readable storage medium for storing a module of a computer program;

a memory into which a module is loaded;

a processor configured to determine whether a first module which is loaded has passed pre-verification one-module-at-a-time, to read a pre-verification constraint on a constrained module, if any, based on a determination that the first module has passed pre-verification, to determine whether the constrained module is loaded based on a determination that any pre-verification constraint is read, to enforce the pre-verification constraint if the constrained module is loaded, and to load the constrained module and enforce the pre-verification constraint based on a determination that the constrained module is not loaded.

13. The verification apparatus of claim 12, wherein the processor is further configured to send an error message if the constrained module fails to satisfy the pre-verification constraint during said enforcing.

14. The verification apparatus of claim 12, wherein the processor is further configured to return to reading a pre-verification constraint on a constrained module if the constrained module passes the pre-verification constraint during said enforcing, until all pre-verification constraints are read.

15. The verification apparatus of claim 12, wherein the processor is further configured to return to reading a pre-verification constraint on a constrained module if the constrained module passes the pre-verification constraint during said enforcing, until all pre-verification constraints are read, whereby the first module is verified.

16. A signal transmission comprising:

a carrier wave on a communications line; and signals indicative of computer controlling commands, transmitted using the carrier wave, that for each instruction in a first module, determine whether an instruction in the first module requires information in a referenced module different than the first module to verify the instruction, write a pre-verification constraint for the referenced module without requiring access to the referenced module if the information is required, and perform any intra-module check required for the instruction after the pre-verification constraint has been written, wherein an intra-module check is performed, if needed, when the information is not required; and that provide a message when an the instruction of the module fails to satisfy any intra-module check.

17. A signal transmission comprising:

a carrier wave on a communications line; and signals indicative of computer controlling commands, transmitted using the carrier wave for determining whether a first module which is loaded has passed pre-verification one-module-at-a-time, for reading a pre-verification constraint on a constrained module, if any, based on a determination that the first module has passed pre-verification, for determining whether the constrained module is loaded based on a determination that any pre-verification constraint is read, for enforcing the pre-verification constraint based on a determination that the constrained module is loaded, and for loading the constrained module and enforcing the pre-verification constraint based on a determination that the constrained module is not loaded.

18. The signal transmission of claim 17, further comprising computer controlling commands, transmitted using the carrier wave, for sending an error message if the constrained module fails to satisfy the pre-verification constraint while enforcing the pre-verification constraint.

19. The signal transmission of claim 17, further comprising computer controlling commands, transmitted using the carrier wave, for returning to reading a pre-verification constraint on a constrained module, if the constrained module passes the pre-verification constraint during said enforcing, until all pre-verification constraints are read.

20. The signal transmission of claim 17, further comprising computer controlling commands, transmitted using the carrier wave, for returning to reading a pre-verification constraint on a constrained module, if the constrained module passes the pre-verification constraint during said enforcing, until all pre-verification constraints are read, whereby the first module is verified.

21. A pre-verification system comprising:

a network;

a computer readable storage medium connected to the network for storing a module of a computer program;

a memory connected to the network into which a module is loaded;

a processor connected to the network, configured to: for each instruction in a first module, determine whether an instruction in the first module requires information in a referenced module different than the first module to verify the instruction, write a pre-verification constraint for the referenced module without requiring access to the referenced module if the information is required, and perform any intra-module check required for the instruction after the pre-verification constraint has been written, wherein an intra-module check is performed, if needed, when the information is not required; and provide a message when an the instruction of the module fails to satisfy any intra-module check, whereby pre-verification is performed one-module-at-a-time; and a processor connected to the network configured to determine whether a first module which is loaded has passed pre-verification one-module-at-a-time, to read a pre-verification constraint on a constrained module, if any, based on a determination that the first module has passed pre-verification, to determine whether the constrained module is loaded based on a determination that any pre-verification constraint is read, to enforce the pre-verification constraint if the constrained module is already loaded, and to load the constrained module and enforce the pre-verification constraint based on a determination that the constrained module is not loaded, whereby verification is performed one-module-at-a-time before linking with reduced verification during linking.

* * * * *

UNITED STATES PATENT AND TRADEMARK OFFICE
CERTIFICATE OF CORRECTION

PATENT NO. : 6,618,769 B1  Page 1 of 1
DATED : September 9, 2003
INVENTOR(S) : Gilad Bracha et al.

It is certified that error appears in the above-identified patent and that said Letters Patent is hereby corrected as shown below:

Column 23,
Line 43, "an the instruction" should read -- an instruction --.

Column 24,
Line 24, "an the instruction" should read -- an instruction --.

Column 25,
Lines 12 and 61, "an the instruction" should read -- an instruction --.

Column 26,
Line 48, "an the instruction" should read -- an instruction --.

Signed and Sealed this

Twentieth Day of January, 2004

JON W. DUDAS
*Acting Director of the United States Patent and Trademark Office*